(12) United States Patent
Rachevsky et al.

(10) Patent No.: US 8,972,312 B2
(45) Date of Patent: Mar. 3, 2015

(54) METHODS AND APPARATUS FOR PERFORMING TRANSFORMATION TECHNIQUES FOR DATA CLUSTERING AND/OR CLASSIFICATION

(75) Inventors: Leonid Rachevsky, Ossining, NY (US); Dimitri Kanevsky, Ossining, NY (US); Bhuvana Ramabhadran, Mount Kisco, NY (US)

(73) Assignee: Nuance Communications, Inc., Burlington, MA (US)

( * ) Notice: Subject to any disclaimer, the term of this patent is extended or adjusted under 35 U.S.C. 154(b) by 273 days.

(21) Appl. No.: 13/569,742

(22) Filed: Aug. 8, 2012

(65) Prior Publication Data

US 2013/0325759 A1 Dec. 5, 2013

Related U.S. Application Data

(60) Provisional application No. 61/652,566, filed on May 29, 2012.

(51) Int. Cl.
*G06F 15/18* (2006.01)
*G10L 15/06* (2013.01)
*G06N 99/00* (2010.01)
*G06K 9/62* (2006.01)

(52) U.S. Cl.
CPC ............ *G10L 15/063* (2013.01); *G06N 99/005* (2013.01); *G06K 9/6232* (2013.01); *G06K 9/6269* (2013.01)
USPC .......................................................... 706/12

(58) Field of Classification Search
None
See application file for complete search history.

(56) References Cited

U.S. PATENT DOCUMENTS

| 6,269,153 | B1 * | 7/2001 | Carpenter et al. | 379/88.02 |
| 7,194,471 | B1 * | 3/2007 | Nagatsuka et al. | 1/1 |
| 2005/0049876 | A1 * | 3/2005 | Agranat | 704/270 |
| 2008/0281814 | A1 * | 11/2008 | Calistri-Yeh et al. | 707/5 |
| 2012/0016673 | A1 * | 1/2012 | Das | 704/246 |

OTHER PUBLICATIONS

Accurate Audio-Segment Classification Using Feature Extraction Matrix Naoki Nitanda, Miki Haseyama, and Hideo Kitajima © 2005 IEEE.*
Musical Genre Classification of Audio Signals George Tzanetakis, Student Member, IEEE, and Perry Cook, Member, IEEE IEEE Transactions on Speech and Audio Processing, vol. 10, No. 5, Jul. 2002.*

(Continued)

*Primary Examiner* — Kakali Chaki
*Assistant Examiner* — Luis Sitiriche
(74) *Attorney, Agent, or Firm* — Wolf, Greenfield & Sacks, P.C.

(57) ABSTRACT

Some aspects include transforming data for which at least one constraint has been specified on a portion of the data, the at least one constraint relating to a similarity and/or dissimilarity of at least some of the portion of the data. Techniques comprise determining a first transformation that approximates the at least one constraint using a cosine similarity as a measure of the similarity and/or dissimilarity of the at least a portion of the data, applying at least the first transformation to the data to obtain transformed data, and fitting a plurality of clusters to the transformed data to obtain a plurality of established clusters. Some aspects include classifying input data by transforming the input data using at least the first transformation and comparing the transformed input data to the established clusters.

33 Claims, 10 Drawing Sheets

(56) References Cited

OTHER PUBLICATIONS

"Testing Supervised Classifiers Based on Non-Negative Matrix Factorization to Musical Instrument Classification" Emmanouil Benetos Constantine Kotropoulos Thomas Lidy and Andreas Rauber (2006). Paper presented at the EUSIPCO 2006: 14th European Signal Processing Conference, Sep. 4-8, 2006, Florence, Italy.*

Alipanahi et al. "Distance metric learning versus Fisher discriminant analysis" Proceedings of the $23^{rd}$ AAAI Conference on artificial intelligence (AAAI), 2008.

Bar-Hillel et al, "Learning distance functions using equivalence relations" The twentieth international Conference on machine learning (ICML), 2003.

Ben-Hur et al. "Vector Clustering", The Journal of machine learning research, 125-137, 2001.

Jain et al. "Data clustering: a review" ACM Computing Surveys, 31(S3):264323, 1999.

Rachevsky et al. "Clustering with modified cosine distance learned from constraints" IBM T.J. Watson Research Center.

Sarikaya "Rapid bootstrapping of statistical spoken dialog systems", Speech communications, vol. 50, No. 7, pp. 580-593, Jul. 2008.

Tao et al. "Posterior probability support vector machines for unbalanced data", IEEE Trans Neural Netw, v. 16(6), 1561-73, 2005.

Vapnik "Statistical leaning theory", 1998, John Willey & Sons.

Wagstaff et al. "Constrained K-means clustering with background knowledge", Proceedings of the $18^{th}$ International Conference on Machine Learning, 2001, p. 577584.

Weinberger et al. "Distance metric learning for large margin nearest neighbor classification", Journal of machine learning research 10 (2009) 207-244.

Xing et al. "Distance metric learning with application to clustering with side-information", Proc. NIPS., 2002.

* cited by examiner

METHODS AND APPARATUS FOR PERFORMING TRANSFORMATION TECHNIQUES FOR DATA CLUSTERING AND/OR CLASSIFICATION

CROSS-REFERENCE TO RELATED APPLICATION

The present application claims the benefit under 35 U.S.C. §119(e) of U.S. Provisional Application Ser. No. 61/652,566, filed on May 29, 2012, titled "Feature Space Transformations Based on Approximation of Constraints," which is herein incorporated by reference in its entirety.

BACKGROUND

Statistical speech and language processing systems are used in a variety of industries such as travel, automotive, and financial services. Such systems may receive a spoken utterance from a human user, process the utterance to extract some relevant semantic information, and use the semantic information to perform an action in response to the user's utterance. For example, an interactive voice response system (IVRS) may receive speech input from the user, classify the speech input to understand the intent of the user, and perform one or more actions in response to the user's speech input (e.g., perform a search, execute one or more commands, navigate a website or the internet, route calls, etc., based on the classification of the speech input).

To enable a speech application to perform classification of speech input, the speech application may be trained with a predetermined set of training data that models real-world utterances spoken by users. Such training data can be generated from a sample corpus of speech or from samples of user utterances obtained via an existing/deployed system or application that receives relevant user speech. The sample utterances in the training data are typically grouped or clustered, and each cluster labeled according to one or more similarities or shared traits that are characteristic of the cluster (e.g., labeled according to a shared semantic meaning of the utterances in respective clusters).

In a speech application such as an IVRS, an action may be associated with each cluster as appropriate for the given speech application or system. The resulting labeled clusters may then provide a basis for classifying actual user utterances during operation of the system so that appropriate action may be taken in response to user speech input (e.g., executing a speech command, performing a search, routing calls, or otherwise navigating a speech enabled application based on the classification given to a respective user utterance). That is, speech input may be received by the system and classified, and one or more actions taken based on the classification.

The training process typically involves identifying a desired number of clusters in the training data, locating a cluster center for each data cluster, and labeling the identified clusters with an associated classification. Clustering algorithms generally process a given set of data to identify data clusters in the distribution and determine a characteristic point or cluster center for each cluster (e.g., a cluster mean, centroid or other generally centrally located point of the cluster). Each observation or data point in the training data may be categorized as belonging to the cluster it is nearest by identifying the least distance cluster center for the respective observation.

Ideally, training data is distributed in a given space such that clusters tend to include data having one or more shared relationships with respect to that information type (e.g., the data in each cluster belongs to respective classifications of interest). When identified clusters (e.g., characterized by the cluster center and/or one or more additional cluster attributes) have been established, i.e., fit to the data, the established clusters may be labeled to indicate the corresponding classification associated with the data. The classifications by which clusters are labeled may represent one or more shared relationships, properties or traits of the clustered data that are of interest (e.g., the semantic meaning of user utterances in a speech application), and/or may by labeled with an indication of one or more actions that should be taken responsive to receiving speech of the corresponding classifications.

Thus, clustering is often performed using an algorithm that seeks to identify a predetermined number of clusters in the data and determine a cluster center for each identified cluster. For example, the K-means algorithm partitions a set of data (observations) into k clusters and assigns each observation to the cluster having the closest mean. Accordingly, each of the k clusters may be defined, at least in part, by the mean of the identified cluster of data, and labeled with an identifier indicating the classification that the cluster represents. Each observation in the data may also be labeled according to the cluster mean to which it is most closely located.

Another clustering method uses Gaussian Mixture Models (GMMs) to model a given set of data by fitting a designated number of Gaussians to the data. An expectation/maximization (EM) algorithm may be used to identify at least the means and standard deviations of the k GMMs that optimally fit the data. After fitting the GMMs to the data, each GMM may be labeled with one of a desired number of classifications corresponding to the type of data in the cluster the respective GMM is fit to. Other algorithms are also available that generally seek to locate the center of clusters of data and optionally to associate data with the most proximately located cluster center.

Established and labeled clusters may then be used to classify new data (e.g., data not necessarily in the training data) as belonging to one of the labeled clusters based on similarity (e.g., based on which cluster the new data is closest to in a given feature space). For example, the new data may be compared to each of the labeled clusters (e.g., the center or mean of a cluster) to evaluate which cluster the new data is nearest. The new data may then be labeled according to the cluster it most closely corresponds to from a proximity standpoint and a desired action may be performed based on the classification of the new data.

SUMMARY

Some embodiments include a method of transforming data for which at least one constraint has been specified on a portion of the data, the at least one constraint relating to a similarity and/or dissimilarity of at least some of the portion of the data, the method comprising determining a first transformation that approximates the at least one constraint using a cosine similarity as a measure of the similarity and/or dissimilarity of the at least a portion of the data, applying at least the first transformation to the data to obtain transformed data, and fitting a plurality of clusters to the transformed data to obtain a plurality of established clusters.

Some embodiments include at least one computer readable storage medium storing instructions that, when executed by at least one processor, perform a method of transforming data for which at least one constraint has been specified on a portion of the data, the at least one constraint relating to a similarity and/or dissimilarity of at least some of the portion of the data, the method comprising determining a first transformation that approximates the at least one constraint using a cosine similarity as a measure of the similarity and/or dissimilarity of the at least a portion of the data, applying at least the first transformation to the data to obtain transformed data, and fitting a plurality of clusters to the transformed data to obtain a plurality of established clusters.

Some embodiments include a system for transforming data for which at least one constraint has been specified on a portion of the data, the at least one constraint relating to a similarity and/or dissimilarity of at least some of the portion of the data, the system comprising at least one computer readable storage medium to store the data, and at least one processor capable of accessing the at least one computer readable storage medium, the at least one processor configured to determine a first transformation that approximates the at least one constraint using a cosine similarity as a measure of the similarity and/or dissimilarity of the at least a portion of the data, apply at least the first transformation to the data to obtain transformed data, and fit a plurality of clusters to the transformed data to obtain a plurality of established clusters.

Some embodiments include a method of classifying input data as belonging to one of a plurality of classifications, the plurality of classifications associated with a respective plurality of clusters that were fit to training data, the method comprising obtaining a first transformation used to transform the training data when the plurality of clusters were fit to the training data, the first transformation approximating at least one constraint relating to a similarity and/or dissimilarity of at least a portion of the training data, wherein the first transformation was determined using a cosine similarity as a measure of the similarity and/or dissimilarity of the at least a portion of the training data, transforming the input data using at least the first transformation to obtain transformed input data, comparing the transformed input data to the plurality of clusters to determine which cluster of the plurality of clusters the input data should be associated with, and classifying the input data according to a classification of the plurality of classifications associated with the cluster that the input data was determined to be associated with.

Some embodiments include at least one computer readable storage medium storing instructions, that when executed by at least one processor, perform a method of classifying input data as belonging to one of a plurality of classifications, the plurality of classifications associated with a respective plurality of clusters that were fit to training data, the method comprising obtaining a first transformation used to transform the training data when the plurality of clusters were fit to the training data, the first transformation approximating at least one constraint relating to a similarity and/or dissimilarity of at least a portion of the training data, wherein the first transformation was determined using a cosine similarity as a measure of the similarity and/or dissimilarity of the at least a portion of the training data, transforming the input data using at least the first transformation to obtain transformed input data, comparing the transformed input data to the plurality of clusters to determine which cluster of the plurality of clusters the input data should be associated with, and classifying the input data according to a classification of the plurality of classifications associated with the cluster that the input data was determined to be associated with.

Some embodiments include a system for classifying input data as belonging to one of a plurality of classifications, the plurality of classifications associated with a respective plurality of clusters that were fit to training data, the system comprising at least one computer readable storage medium for storing the input data and for storing a first transformation used to transform the training data when the plurality of clusters were fit to the training data, the first transformation approximating at least one constraint relating to a similarity and/or dissimilarity of at least a portion of the training data, wherein the first transformation was determined using a cosine similarity as a measure of the similarity and/or dissimilarity of the at least a portion of the training data, and at least one processor capable of accessing the at least one computer readable storage medium, the at least one processor configured to transform the input data using at least the first transformation to obtain transformed input data, compare the transformed input data to the plurality of clusters to determine which cluster of the plurality of clusters the input data should be associated with, and classify the input data according to a classification of the plurality of classifications associated with the cluster that the input data was determined to be associated with.

BRIEF DESCRIPTION OF THE DRAWINGS

The accompanying drawings are not intended to be drawn to scale. For purposes of clarity, not every component may be labeled in every drawing. In the drawings.

DETAILED DESCRIPTION

Figure 1:
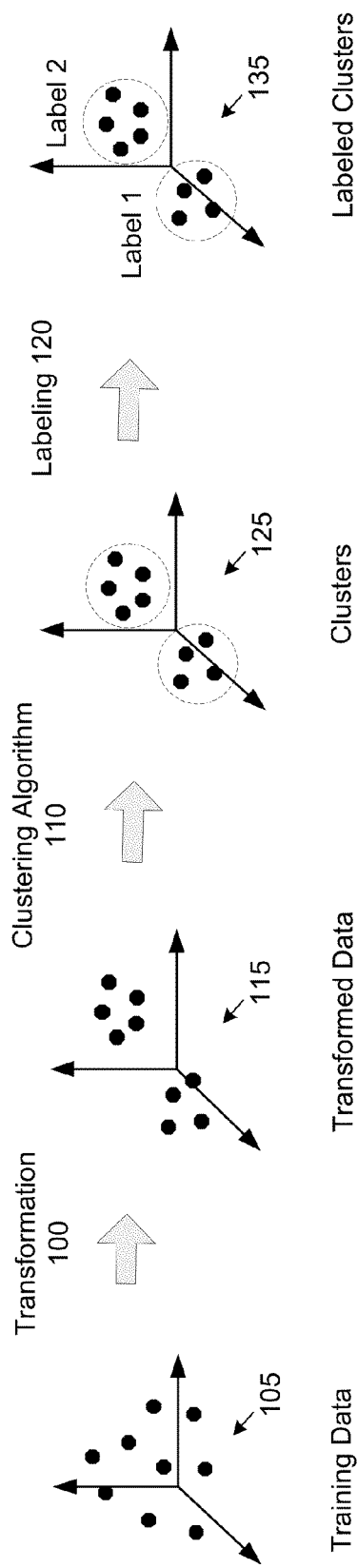
FIG. 1 is a schematic illustration of a transformation that redistributes data in a given space to facilitate clustering.

As discussed above, many applications and application types may benefit from the ability to cluster data sharing one or more relationships (e.g., data that shares a given feature, property or characteristic) and label the data clusters according to respective classifications reflective of the shared relationships. For example, in a speech application, speech utterances may be clustered according to semantic meaning and established clusters labeled with a classification related to the semantic meaning (e.g., labeled with an indication of one or more actions that should be taken when speech of the corresponding classification is received).

Grouping classes of data in this manner is often achieved, at least in part, by using a clustering algorithm that, given a set of data, seeks to fit the set of data with a desired number of clusters and to assign membership of each observation in the data to one of the clusters based on which cluster the observation is nearest. Clustered and labeled data may then be used to classify new data by evaluating which established cluster the new data is closest to.

Ideally, for each of a designated number of classifications, data of a given classification will fall within the corresponding cluster. However, achieving accurate clustering is difficult to do, particularly with data that does not cluster well according to the classifications by which it is desired to associate the data. Accordingly, the success of automated clustering depends, at least in part, on how well similar and dissimilar data is separated (e.g., how well data is distributed according to classifications of interest). As a result of this difficulty, training data must often be hand annotated by a human operator to label the data (referred to as supervised training), which is generally a very time intensive process.

Effective automated clustering techniques may therefore play an important role in reducing the human labor component of training a classification system (e.g., a speech application such as an IVRS). Automated or unsupervised clustering may be used alone or in combination with human assisted clustering and/or labeling. For example, a clustering algorithm may perform the time and computation intensive organization of data (frequently very large amounts of data) into a relatively small number of clusters and a human annotator may assign labels to clusters and/or may add or remove data from the clusters or modify the clusters to better conform with the assigned labels as appropriate.

The inventors have appreciated that the performance of automated clustering depends not only on how well data is separated according to classifications of interest, but on the measure of similarity used to evaluate proximity, and have recognized that conventional measures (e.g., Euclidean distances) may not be the most effective measures of similarity between data. The inventors have identified measures of proximity that may provide a better assessment of similarity of data. According to some embodiments, one or more cosine measures are employed to determine the closeness or proximity of the data (e.g., the distance between two data points in a feature space) to better capture similarity in the data, as discussed in further detail below.

Data clustering is often performed by converting training data into feature vectors representing the data. That is, for each observation (data point) in the training data, a feature vector may be generated corresponding to the respective observation. Each component of a feature vector may represent a value associated with a respective feature of the corresponding observation such that the feature vector generally describes the features or properties of the data deemed relevant or of interest to a particular application. According to some embodiments, a cosine measure may be used to produce values related to the angle between two feature vectors, which may be a better indicator of similarity than conventional distance measures. Such cosine measures may be used during clustering and/or classification in circumstances in which proximity is being evaluated.

The inventors have further appreciated that training data often distributes in a given feature space such that similar and dissimilar data are poorly separated. In such circumstances, it may be difficult to effectively cluster the data based on their location in the feature space using automated clustering operations. The inventors have developed transformation techniques that seek to re-distribute the data such that similar data tends to be closer together and dissimilar data tends to be farther apart, thus facilitating more effective clustering of the data into related groups, as discussed in further detail below.

According to some embodiments, one or more transformations are applied to feature vectors representing a given set of data to achieve improved separation between similar and dissimilar feature vectors, thus facilitating more accurate clustering of the data. For example, a transformation may produce improved separation by applying and/or approximating one or more constraints on the data. Some techniques exploit a priori information, known relationships and/or one or more specified constraints to formulate a transformation that tends to separate similar data from dissimilar data. The inventors have appreciated that using a cosine measure to evaluate one or more constraints on the data may produce proximity results that better reflect similarity/dissimilarity in the data, as discussed in further detail below.

According to some embodiments, constraints applied to the data include pairwise must-link and cannot-link constraints, which may be incorporated into one or more transformations that seek to shift must-link feature vectors closer together and shift cannot-link feature vectors farther apart. The must-link and cannot-link constraints may be specified for some portion of the training data prior to clustering (e.g., by a human operator), as discussed in further detail below. Must-link and cannot-link constraints are one example of specified relationships between a portion of a given set of training data that may be used as a constraint. It should be appreciated that the terms must-link and cannot-link are merely convenient terminology used to describe constraints that indicate training data that should be considered similar and dissimilar, respectively, and other names may be given to this construct (e.g., the terms should-group and should-not-group, or similar and dissimilar could just as well be used as they are merely labels describing a certain type of constraint).

In some embodiments, a transformation based on must-link and cannot-link constraints is determined by an optimization that seeks to minimize distances between must-link pairs while maximizing distances between cannot-link pairs. The inventors have appreciated that using a cosine measure as the "distance" on which the transformation is determined may result in improved separation of the training data and consequently result in better clustering. It should be appreciated that a transformation computed in this respect may also be used to transform new data during a subsequent classification phase to facilitate improved classification of new data with respect to previously established and labeled clusters.

The inventors have further appreciated that generally advantageous separation of data may be achieved by transforming a set of data into a different space (e.g., data having a generally undesirable distribution in a given space from a clustering perspective may be transformed into a different space having a more favorable distribution). For example, data represented by feature vectors may be transformed from a feature space to produce transformed vectors in a different representational space where the transformed vectors are better separated according to desired classifications. According to some embodiments, a given set of data may be transformed into a lower dimensional space such as a representational space having a dimensionality related to the number of desired classifications by which the data is to be clustered.

In this respect, some embodiments include applying one or more transformations that modify the dimensionality of the representation of the data (e.g., changes the dimensionality of feature vectors that represent a given set of data) and, as such, change the dimensionality of the space in which the data is represented. Some embodiments include transforming feature vectors into a lower dimensional space. For example, feature vectors may be transformed from feature space to produce transformed vectors in a representational space having a dimensionality related to the number of classifications/ labels for which the data is to be clustered and classified.

Such a representational space is referred to herein as "label space" when the coordinate axes of the transformed space (and the corresponding components of the transformed vectors) relate or correspond to the respective classifications by which the data is to be clustered. However, feature vectors may be transformed into other spaces that are higher in dimension and/or not necessarily related to intended classifications, as aspects related to transforming the dimensionality of feature vectors/representational space are not limited for use with any particular transformation or transformation type.

The inventors have identified a number of transformations that transform a set of data into a different representational space to provide increased separation of data, thus facilitating more accurate clustering of the data. Similarly, such transformations may also be used to transform new data received to facilitate classifying the new data. In particular, new data may be transformed into the same space in which training data was clustered to determine which cluster the new data is closest to, thereby classifying data according to the classification by which the established cluster was labeled (e.g., input data received by a deployed system may be classified to determine one or more actions to take depending on the determined classification).

According to some embodiments, one or more transformations in this respect transform data represented in a feature space into data represented in a label space, wherein the label space has a dimensionality corresponding to the number of classifications by which the data is to be labeled (e.g., the number of clusters fit to the data). Feature vectors transformed into label space may locate the transformed vector with respect to the classifications or labels of interest. Each component of a transformed vector in label space may provide a value indicative of how strongly the associated data resembles the corresponding classification. That is, a transformation may be computed that transforms a feature vector into a transformed vector, wherein each component of the transformed vector indicates the degree to which the associated data relates to the corresponding classification.

The inventors have developed transformations that transform data from feature space to a transformed space based on a plurality of identified representative vectors. For example, data may be transformed based on identified representative vectors associated with respective desired classifications to transform the data to a differently dimensioned representational space that generally exhibits better separation in the data from the perspective of the desired classifications. The term "representative vector" refers to data (often, but not necessarily, in vector form) that is characteristic of a particular group of data and/or classification associated with the data, some examples of which are discussed in further detail below. In some embodiments, the representative vectors may be selected from data that has been pre-labeled according to some desired set of classifications, or may be derived therefrom.

According to some embodiments, the representative vectors that are identified or determined and subsequently used to transform data may include support vectors identified using a Support Vector Machine (SVM) algorithm. Support vectors have the property that they define a boundary between data in one classification and data in other classifications, as discussed in further detail below. Accordingly, when a representative vector comprises a support vector, the representative vector may have increased discriminatory capabilities with respect to identifying which classification data belongs to when used to transform the data, as discussed in further detail below.

Representative vectors may be identified, determined and/or selected in other ways. For example, a representative vector may be the mean vector of feature vectors given the same label, an eigenvector of feature vectors of the same classification, or may be selected due to their proximity to other feature vectors in the same or different classifications, as the aspects in this respect are not limited to the type of data selected as a representative vector or the manner of selection or determination them. The representative vectors, however selected, may form the basis of a transformation that tends to increase the separation of data in accordance with the classifications by which a portion of the data is pre-labeled prior to clustering, as discussed in further detail below.

The inventors have developed transformations that transform data from feature space to a transformed space based on frequency information obtained from the data. For example, data may be transformed using frequency information obtained from data of desired classifications to transform the data to a differently dimensioned representational space that generally exhibits better separation in the data from the perspective of the desired classifications. The term "frequency information" is used herein to described any information indicative of how frequently a given feature, property or characteristic occurs in data of a given classification and/or data as a whole, or information derived therefrom, as discussed in further detail below.

According to some embodiments, frequency information may be computed from pre-labeled data and used to weight features in training data to bias the data towards classifications that frequently exhibit the same features in the respective data. For example, when a given feature vector includes one or more features that occur frequently in data labeled as belonging to a given classification, a weighting scheme based on frequency information obtained from pre-labeled data may be used to transform the given feature vector to better align with the corresponding classification.

According to some embodiments, frequency information obtained from at least a portion of a given set of data may be incorporated into one or more transformations that map feature vectors from a feature space into transformed vectors in a transformed space (e.g., into label space) such that the transformed vectors tend to cluster according to classification (e.g., feature vectors that share features occurring frequently in data of a given classification will correlate with the transformation to better cluster according to classification after transformation), as discussed in further detail below.

The inventors have further appreciated that the techniques described above and in further detail below may also be used in combination to facilitate separation of a given set of data (e.g., for clustering or other analysis) and/or to improve classification. In particular, transformations that transform data from a feature space to a different space (e.g., a lower dimensional space corresponding to classifications of interest) and transformations that transform feature vectors according to one or more constraints using a cosine measure may be used alone or in any combination to achieve separation amongst the data to facilitate improved clustering and/or classification of data of interest.

As described in the foregoing, classifying data typically involves two phases; a training phase in which training data is clustered and labeled, and a classification phase during which new data is classified by evaluating which of the labeled clusters the new data likely belongs to (e.g., which cluster the data is closest to or to which cluster the new data most closely relates). The inventors have appreciated that the transformations described herein may be used both in clustering data in the training phase and in evaluating which labeled cluster new data belongs to during subsequent classification phases.

Following below are more detailed descriptions of various concepts related to, and embodiments of, methods and apparatus according to the present invention. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein. Further, while some embodiments may be described as implementing some of the techniques described herein, it should be appreciated that embodiments may implement one, some, or all of the techniques described herein in any suitable combination.

As discussed above, the inventors have developed transformations that tend to separate the data based on one or more similarities or relationships (e.g., according to a number of desired classifications). Some transformations seek to redistribute data such that similar data are closer together and dissimilar data are farther apart than before transformation was performed. FIG. 1 includes a schematic depiction of transforming a set of data to assist in illustrating principles underlying certain techniques described herein. Plot 105 shows a number of example observations (represented as feature vectors) in a given feature space, schematically illustrating how an arbitrary set of feature vectors may be naturally distributed in given feature space. Such a distribution may be difficult for a clustering algorithm to meaningfully fit clusters to according to desired classifications.

Some transformations described herein redistribute the data to achieve improved separation. For example, transformation 100 transforms the feature vectors such that the transformed feature vectors are better separated in the feature space (e.g., so that similar feature vectors are brought closer together and dissimilar vectors are moved further apart) as shown in schematic plot 115 illustrated in FIG. 2. As such, a clustering algorithm 110 may be better capable of assigning meaningful clusters to the data as shown in schematic plot 125. That is, transformation 100 may redistribute the data such that a number of clusters corresponding to desired classifications can be more meaningfully fit to the redistributed data. The established clusters may then be labeled via a labeling process 120 to label them according to corresponding classifications, for example, by a human annotator or otherwise.

Figure 2:
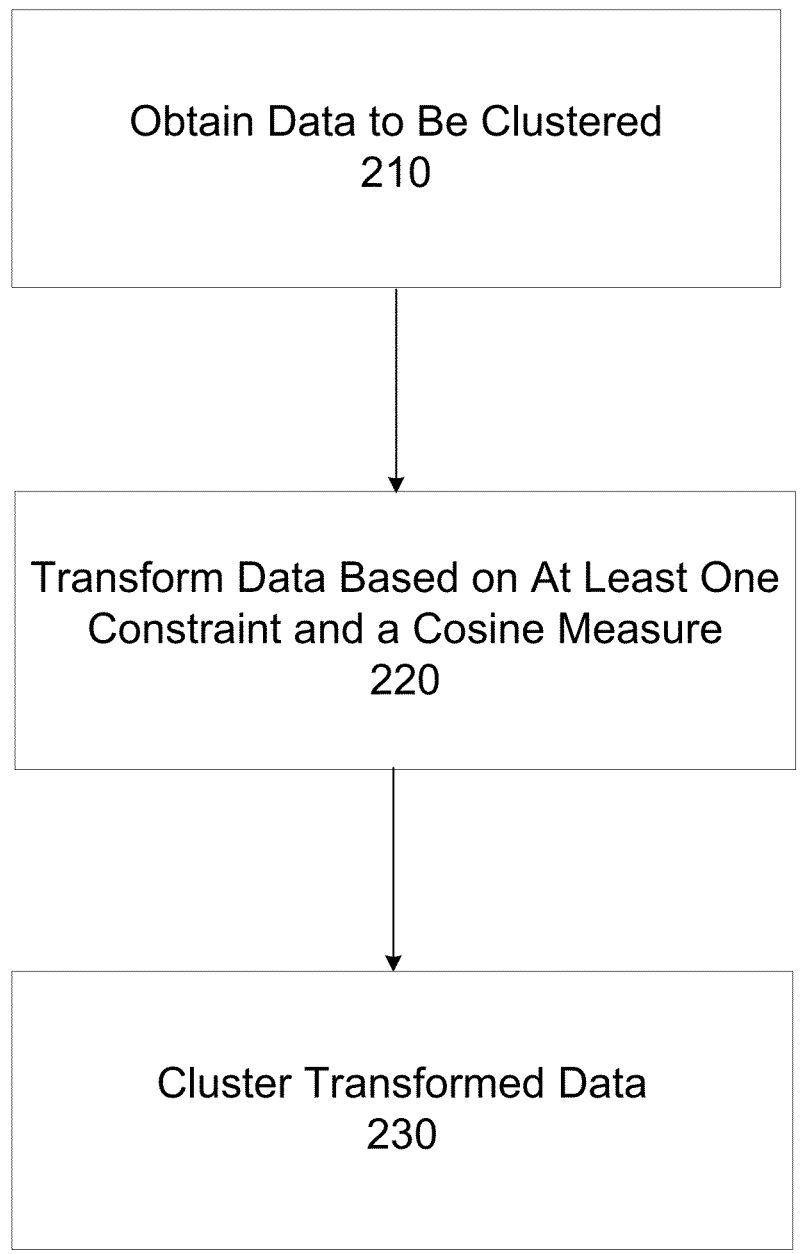
FIG. 2 illustrates a method of transforming data to facilitate clustering, in accordance with some embodiments.

FIG. 2 is a flowchart illustrating a method for transforming data to facilitate clustering, in accordance with some embodiments. In act 210, data to be clustered is obtained. For example, training data for training a system to classify new data received during operation of the system may be obtained. According to some embodiments, the data includes speech information for training a speech application, such as an IVRS or a natural language understanding application, and may include examples of user utterances (e.g., samples of user utterances expected to be received by the system, or actual user utterances previously received by a system during operation, etc.).

However, the data may represent other information, for example, image data for training a computer vision application, or data representing any other type of information for which clustering and/or classification may be desired, as the aspects of the invention are not limited for use with any particular type of data and/or for use in any particular type of system. As will be appreciated from the description that follows, the techniques described herein may be applied to data of any type for which clustering and/or classifying is sought.

In act 220, the data is transformed based on at least one constraint on the data and a cosine measure relating to data proximity. For example, one or more cosine measures may be applied to measure the similarity between data in a formulation that produces a transformation that approximates the at least one constraint, as discussed in further detail below. If the data is not already in a suitable format, it may be converted to a set of data represented in a given feature space. For example, a set of features vectors representing the data may be formed wherein each feature vector represents a respective observation in the obtained data. Each feature vector may include a plurality of components that describe some aspect of the data (e.g., each component may correspond to a respective feature and may include a value (or multiple values) indicative of the associated observation's relationship to that feature).

A feature vector may be of any length (e.g., may have any number of components indicating any type of information about the data), the length generally defining the dimensionality of the feature space. As such, each feature vector may be viewed as a coordinate or point in the corresponding feature space. The length and the type of information stored in feature vectors will depend on the type of the data obtained and/or the nature of the application or system in which the data will be used and/or on which the application or system is being trained.

To illustrate one example, the data obtained in act 210 may include utterances in the context of a corresponding speech application. A feature vector for this data may include a vector component corresponding to each word in a vocabulary of interest, which vocabulary may depend on the nature and/or type of the speech application, and the context in which speech is being classified. A feature vector may be formed for each utterance (i.e., each observation in the obtained data), or a subset thereof, with the vector components storing, for example, the number of times the word associated with the respective vector component appears in the corresponding utterance. As such, the dimensionality of the feature space in this example corresponds to the number of words in the vocabulary of interest and the feature vector locates the utterance in this feature space (i.e., in the space of the vocabulary of interest).

Take for example the utterance "Please open a new account," in the context of a vocabulary of interest have N words, including the words open, new and account. A feature vector representing this utterance may include vector components for which the value of the components corresponding to the words open, new and account are set to one (1) and all other components are set to zero (0). In this example, the words please and a may not be part of the vocabulary of interest because they may not carry much or any discriminatory value with respect to the meaning of the utterance, though these words may carry value in any given context and therefore included in the vocabulary of interest. Thus, the content of a vocabulary may depend on context and the purpose and function for which clustering and/or classification is being performed. A feature vector as described above may be determined for each utterance in the obtained data (e.g., training data), or a subset thereof.

As another example, the data to be clustered may be or represent images for an image classification system, wherein each vector component of feature vectors representing the images corresponds to a respective pixel/voxel in the image and stores a value corresponding to the pixel/voxel intensity.

Such feature vectors would locate the images in an image space. It should be appreciated that the above examples of types of data are merely illustrative of types of data for which techniques described herein may be applied to improve clustering and/or classification. However, feature vectors may be defined for any type of data to capture relevant information about the data and to represent the corresponding data in a feature space of interest, and techniques described herein may be applied to feature vectors representing any type of data and formulated in an manner.

Figure 3A:
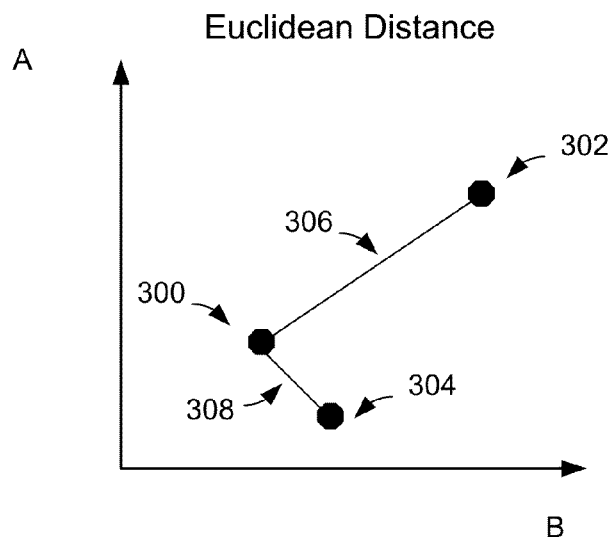
FIG. 3A is a schematic illustrating a distance computed using a conventional Euclidean distance.
Figure 3B:
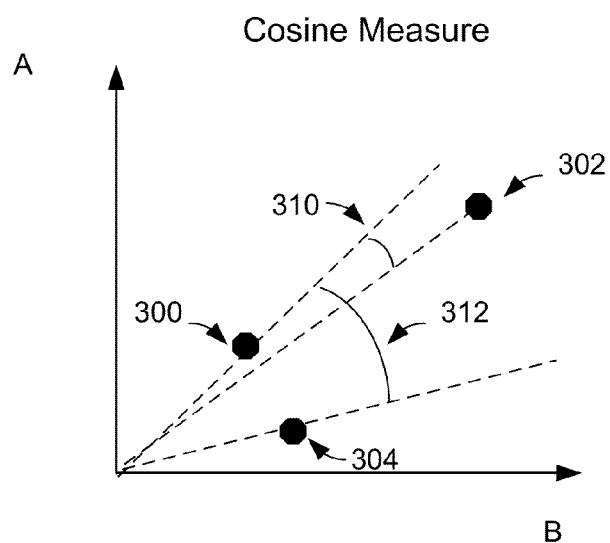
FIG. 3B is a schematic illustrating a similarity computed using a cosine measure, in accordance with some embodiments.

As discussed above, the inventors have appreciated that using a cosine similarity, as in act 220, may be a better indicator of similarity than conventional measures of closeness, such as Euclidean distances. FIGS. 3A and 3B illustrate a schematic plot of three observations in a feature space to illustrate principles of using a cosine measure as an indicator of similarity between two feature vectors.

The three observations are represented by feature vectors 300, 302 and 304 in a two-dimensional feature space characterized by feature component A and feature component B (i.e., the feature vectors are represented as points in the feature space). FIG. 3A illustrates using a conventional Euclidean distance to determine the closeness or proximity of the feature vectors. According to a Euclidean distance, vector 300 is closer to vector 304 than it is to vector 302. In particular, the Euclidean distance between vectors 300 and 304, denoted by distance 308, is smaller than the Euclidean distance between vectors 300 and 302, denoted by distance 306.

FIG. 3B shows the same three feature vectors 300, 302, 304 in the same feature space, but with distances measured using an exemplary cosine measure, in accordance with some embodiments. According to the exemplary cosine measure, vector 300 is closer to vector 302 than it is to vector 304 (e.g., the vector 300 represents data that may be considered more similar to data represented by vector 302 than data represented by vector 304). In particular, distance 310 (e.g., representative of an angle between vectors 300 and 302) is smaller than the distance 312 (e.g., representative of an angle between vectors 300 and 304). Thus, as illustrated, different measures of proximity may result in different assessments regarding similarity.

Some exemplary cosine measures convert the angle between vectors into a similarity value. As the orthogonality of vectors increase, the angle between such vectors also increases and the cosine of the angle decreases. As the proportionality of vectors increase, the angle between such vectors decrease and the cosine of the angle increases. Accordingly, the cosine measure between vectors increases the more similar the vectors are according to some exemplary cosine measures (e.g., as the "distance" measured by angle decreases, the cosine similarity increases). However, it should be appreciated that the sine function may be used so that the resulting measure decreases as the angle between vectors decrease in circumstances where it may be more desirable to have the cosine measure provide a "distance" measure as opposed to a "similarity" measure, though the two measures may capture the same information regarding proximity.

The inventors have appreciated that cosine measures may yield more accurate indications of similarity than conventional measures such as Euclidean distance measures, particularly with respect to certain types of data. That is, the inventors have appreciated that a cosine measure may more accurately reflect similarities and/or relationships in the data than conventional measurements. As a result, evaluations based on data proximity may more accurately capture data similarity when a cosine measure is used. For example, applying and/or approximating one or more constraints may be rendered more accurate from a similarity perspective when a cosine measure is used, as discussed in further detail below. According to some embodiments, a cosine measure between two vectors x and y may computed as:

$$\cos(x, y) = \frac{\langle x, y \rangle}{\|x\|\|y\|} \quad (1)$$

In the above equation, the inner product between x and y is defined as $\langle x, y \rangle = x_1 y_1 + x_2 y_2 + \ldots + x_n, y_n$ and the magnitude of vector x is $\|X\| = \sqrt{\langle x, x \rangle}$. In embodiments in which vector components are non-negative, "closeness" values for two vectors may be mapped between zero (0) and one (1), with a value of 0 indicating dissimilar (e.g., orthogonal) feature vectors and a value of 1 indicating similar (e.g., proportional) features vectors. Thus, the above exemplary cosine measure provides an indication of similarity between the two feature vector operands.

It should be appreciated that other cosine measures may be used. For example, the sine function may be a more appropriate similarity measure for certain types of data, and in some situations, one or more functions derived from the sine and/or cosine function may be an appropriate measure of similarity. As such, the term cosine measure refers to measures that use the sine and/or cosine functions (or derivations thereof) to determine a similarity or closeness between data, and/or that use functions or operations that result in an indication of an angle between or angular similarity of the data being operated on (e.g., between feature vectors).

With respect to act 220, when used as the distance measure by which the at least one constraint is approximated via transformation, the transformed data may exhibit better separation according to the at least one constraint. According to some embodiments, the at least one constraint on which the transformation is based includes must-link and cannot-link constraints that have been assigned to pairs of some portion of the data (e.g., some portion of the data obtained in act 210). Typically, only a subset of the data is assigned must-link or cannot-link constraints, however, the entire set of training data may be labeled in some embodiments, as the aspects are not limited to what portion of the data is constrained, or for what portion of the data constraints are specified.

As discussed above, must-link and cannot-link constraints include indications of data pairs that should be grouped together and grouped separately, respectively. These constraints may be provided by a human annotator who provides this information for some portion of the training data, for example, by providing a list of must-link and cannot-link pairs. According to some embodiments, must-link and cannot-link constraints are applied by approximating the constraints by finding a transformation that seeks to minimize the distance between must-link feature vector pairs and maximize the distance between cannot-link feature vector pairs. A cosine similarity measure may be employed as the distance measure by which such a transformation is determined. That is, the distance between must-link and cannot-link pairs computed to determine the transformation may be a cosine measure. An exemplary formulation by which such a transformation may be computed is described below.

According to some embodiments, the transformation may be performed by a matrix Λ computed to approximate the at least one constraint using a cosine measure. In particular, a computed transformation matrix Λ may be used as a matrix multiplier operating on a feature vector x to obtain a transformed vector y, for example, according to the equation $\Lambda x = y$. The matrix $\Lambda$ may be constructed to implement various transformations or mapping functions to approximate one or more desired constraints, for example, must-link and cannot-link constraints using a cosine similarity as a distance measure.

With respect to implementing must-link and cannot-link constraints, the must-link and cannot-link conditions may be represented as $(i, j) \in I_1$, $(i, j) \in I_2$ where $I_1$ and $I_2$ are sets of integer pairs indicating pairs of feature vectors designated as must-link pairs and cannot-link pairs, respectively. The sets $I_1$ and $I_2$ may be defined or specified by a human operator to establish the must-link and cannot-link pairs for a given set of data (e.g., data obtained in act 210). For example, consider for illustration purposes only circumstances wherein the set of data comprises speech utterances and it is desired to cluster the utterances to facilitate classification in a speech application (e.g., a voice response application). Table 1 below shows a portion of exemplary training data that has been labeled as must-link and cannot-link pairs, for example, to train an IVRS for a bank to correctly classify user requests and inquiries.

| Identifier | Utterances | Pair Label |
|---|---|---|
| 1 | "I'd like to get a new account." | Must-Link |
| 27 | "Open a new account." | |
| 152 | "Cancel my account." | Must-Link |
| 46 | "I'd like to close my account." | |
| 111 | "Create an account." | Cannot-Link |
| 58 | "Close my account." | |

The identifier in Table 1 identifies the utterance in the set of data. For example, a given set of training data including N observations may be numerically identified with the integers from 1 to N. Using the exemplary pairwise labeling shown in Table 1 above, $I_1$ would include the integer pairs (1, 27) and (46, 152) and $I_2$ would include the integer pair (58, 111). It should be appreciated that the above example illustrates pairwise labeling of a portion of training data and that $I_1$ and $I_2$ may include all of the pairs of data that are labeled. It should be further appreciated that data of any type may be pairwise labeled in a similar manner and the above example using utterances is only one non-limiting example to illustrate how must-link and cannot-link constraints may be implemented. For example, for image data, images that should be grouped together and those that should not be grouped together may be labeled in the same or similar manner.

As discussed above, the inventors have appreciated that a cosine measure may provide an effective measure of similarity, and may be used in conjunction with one or more constraints to transform data to facilitate improved separation for clustering. Based on this insight, an ideal transformation of the data would transform or map feature vectors in $I_1$ (e.g., similar feature vectors such as those labeled as must-link pairs) into proportional vectors (e.g., co-linear vectors) and transform or map feature vectors in $I_2$ (e.g., dissimilar feature vectors such as those labeled as cannot-link pairs) into orthogonal vectors. Such a transformation would minimize the distance between similar feature vectors and maximize the distance between dissimilar feature vectors from the perspective of the cosine similarity employed.

However, for actual training data (e.g., training data with relatively large numbers of observations and/or training data for which relatively large numbers of constraints $I_1$ and $I_2$ are provided) such a transformation may not exist. The inventors have developed techniques for finding a transformation that approximates the constraint conditions. According to some embodiments, an objective function is provided that operates on a transformation. By optimizing the objective function, a transformation $\Lambda$ may be found that produces the constraint conditions to the extent possible given a set of data and constraints $I_1$ and $I_2$ (i.e., that approximates the set of specified constraints).

The objective function may be selected such that, when optimized, the resulting transformation brings similar feature vectors closer together and moves dissimilar feature vectors farther apart. For example, in some embodiments, a resulting transformation, when applied to feature vectors associated with given training data, moves must-link pairs of feature vectors closer together (e.g., closer to co-linear), and moves cannot-link pairs of feature vectors to be farther apart (e.g., closer to orthogonal), according to a cosine measure. An example objective function $F(\Lambda)$ may be defined as follows.

$$F(\Lambda) = F(X, I; \Lambda) \qquad (2)$$
$$= \sum_{(i,j) \in I_1} \cos(\Lambda x_i, \Lambda x_j) - \sum_{(i,j) \in I_2} \cos(\Lambda x_i, \Lambda x_j)$$

Where X is the set of feature vectors, I is the set of constraints and $\Lambda$ is the transformation to be determined. The objective function $F(\Lambda)$ indicates how well the prescribed constraints I are satisfied by the transformed data. In particular, the first summation term will tend to increase as feature vectors labeled in $I_1$ (e.g., pairs of feature vectors labeled as similar) are transformed by $\Lambda$ to be closer together and the second term will tend to decrease as feature vectors in $I_2$ (e.g., pairs of feature vectors labeled as dissimilar) are transformed by $\Lambda$ to be farther apart. As such, by maximizing the objective function $F(\Lambda)$, a transformation matrix $\Lambda$ may be determined that achieves increased separation of the feature vectors in accordance with the provided constraints. In this way, the transformation matrix $\Lambda$ is a parameter of the objective function that can be determined by generally optimizing the objective function.

In the objective function of equation 2, a cosine measure can be incorporated into the objective function as the measure of proximity. In particular, distances between feature vector pairs in $I_1$ (e.g., feature vectors labeled as must-link pairs) and distances between feature vector pairs in $I_2$ (e.g., feature vectors labeled as cannot-link pairs) are determined by a cosine measure. As such, the objective function $F(\Lambda)$ will be maximized when the first summation term is maximum and the second summation term is minimum, according to the similarity/dissimilarity of the constrained feature vectors as evaluated according to a cosine measure of similarity.

It should be appreciated that the objective function may be maximized using any suitable optimization technique including direct methods, iterative methods, linear programming or any suitable optimization technique, as the aspects are not limited for use with any particular optimization scheme or combination of schemes.

It should further be appreciated that the above formulation of an objective function F is merely one example of a function that operates to separate data according to one or more constraints on the basis of a cosine measure of similarity, and that embodiments that implement an objective function to determine a transformation are not limited to any particular objective function or to any particular formulation of an objective function.

An example transformation Λ that may be used in approximating one or more constraints using a cosine measure (e.g., a transformation produced by optimizing an objective function as illustrated above in equation 2) may be formulated as follows:

$$\Lambda = \begin{bmatrix} m_{11} & m_{12} & m_{13} & m_{1n} \\ m_{21} & m_{22} & m_{23} & m_{2n} \\ m_{31} & m_{32} & m_{33} & m_{3n} \\ m_{m1} & m_{m2} & m_{3} & m_{mn} \end{bmatrix} \quad (3)$$

Where $m_{ij}$ are matrix elements to be determined (e.g., by optimizing a given objective function, determined analytically, or otherwise specified), and n is the dimension of the feature vectors representing a given set of data. According to some embodiments, transformation Λ is a square matrix (e.g., m=n in the above exemplary transformation) such that the dimensions of feature vectors x and transformed vectors y are the same. Such a transformation redistributes the feature vectors in feature space without changing the dimensionality of the vectors or the space in which the data is represented after transformation. According to some embodiments, a transformation Λ may be a diagonal matrix as follows:

$$\Lambda = \begin{bmatrix} m_{11} & 0 & 0 & 0 \\ 0 & m_{22} & 0 & 0 \\ 0 & 0 & m_{33} & 0 \\ 0 & 0 & 0 & m_{nn} \end{bmatrix} \quad (4)$$

In embodiments wherein the transformation includes a diagonal matrix, determining the transformation involves choosing or finding n values (e.g., via optimization of an objective function) for the diagonal elements of the matrix. The resulting transformation Λ may be used to transform feature vectors as follows:

$$\Lambda x = y \Rightarrow \begin{bmatrix} m_{11} & 0 & 0 & 0 \\ 0 & m_{22} & 0 & 0 \\ 0 & 0 & m_{33} & 0 \\ 0 & 0 & 0 & m_{mn} \end{bmatrix} \begin{bmatrix} x_1 \\ x_2 \\ x_3 \\ x_n \end{bmatrix} = \begin{bmatrix} y_1 \\ y_2 \\ y_3 \\ y_n \end{bmatrix} = \begin{bmatrix} m_{11}x_1 \\ m_{22}x_2 \\ m_{33}x_3 \\ m_{44}x_n \end{bmatrix} \quad (5)$$

As shown by the transformation in equation 4, transformation Λ scales the vector components of the feature vectors by the corresponding diagonal matrix elements to shift the feature vectors in feature space such that they are better separated in accordance with the one more constraints on which the transformation was determined. That is, transformation Λ operates on feature vectors x to produce transformed vectors y that are redistributed in feature space such that similar data is shifted closer together and dissimilar data is shifted farther apart according to a cosine measure of proximity.

It should be appreciated that the examples of transformations Λ may be determined in any suitable way, and the selection and/or determination of such a transformation is not limited to optimizing a function, and may be determined using any suitable criterion and/or may be determined iteratively, analytically or otherwise. Likewise, the various transformations Λ illustrated above are exemplary and are not limited to the forms illustrated above (e.g., are not limited to square matrices, diagonal matrices or any type of matrix) and any suitable transformation may be used. As discussed above, a suitable transformation in this respect may be used both to facilitate clustering and to classify new data obtained, for example, during operation of a classification system, as discussed in further detail below.

In act 430, the transformed data (e.g., data transformed by a transformation matrix Λ that approximates at least one constraint using a cosine measure) may be clustered. For example, a K-means algorithm may be used or a GMM approach may be implemented to cluster the data. However, any algorithm capable of identifying clusters of data (e.g., centers of clusters of data) may be used to perform clustering, and optionally, to label the data according to the identified cluster to which the respective data is most closely located. The clusters, however defined, may then be used to classify new data, for example, by evaluating which cluster the new data is "closest" to after transforming the new data using the same transformation or transformations applied in act 220, as discussed in further detail below.

It should be appreciated that cosine measures may also be used to measure proximity by the clustering algorithm to determine the best-fit for the designated number of clusters. Similarly, a cosine measure may be used when evaluating which established cluster data belongs to when labeling the data according to the appropriate cluster and/or classifying new data via the established clusters. As discussed above, the inventors have appreciated that cosine measures may provide better assessments of similarity and therefore may be advantageously used whenever proximity evaluations are performed.

As discussed above, the inventors have further appreciated that transformations that operate to transform data (e.g., feature vectors representing a set of training data) into a different space may facilitate clustering. That is, transforming data into another space by changing the dimensionality by which the data is represented may be used to facilitate clustering by projecting the data into a space having improved separation of the data. According to some embodiments, feature vectors representing data in a feature space are transformed to transformed vectors in a representational space having a dimensionality related to the number of classifications by which the data is to be clustered and/or classified. Such transformations may better separate the data according to desired classifications.

Figure 4:
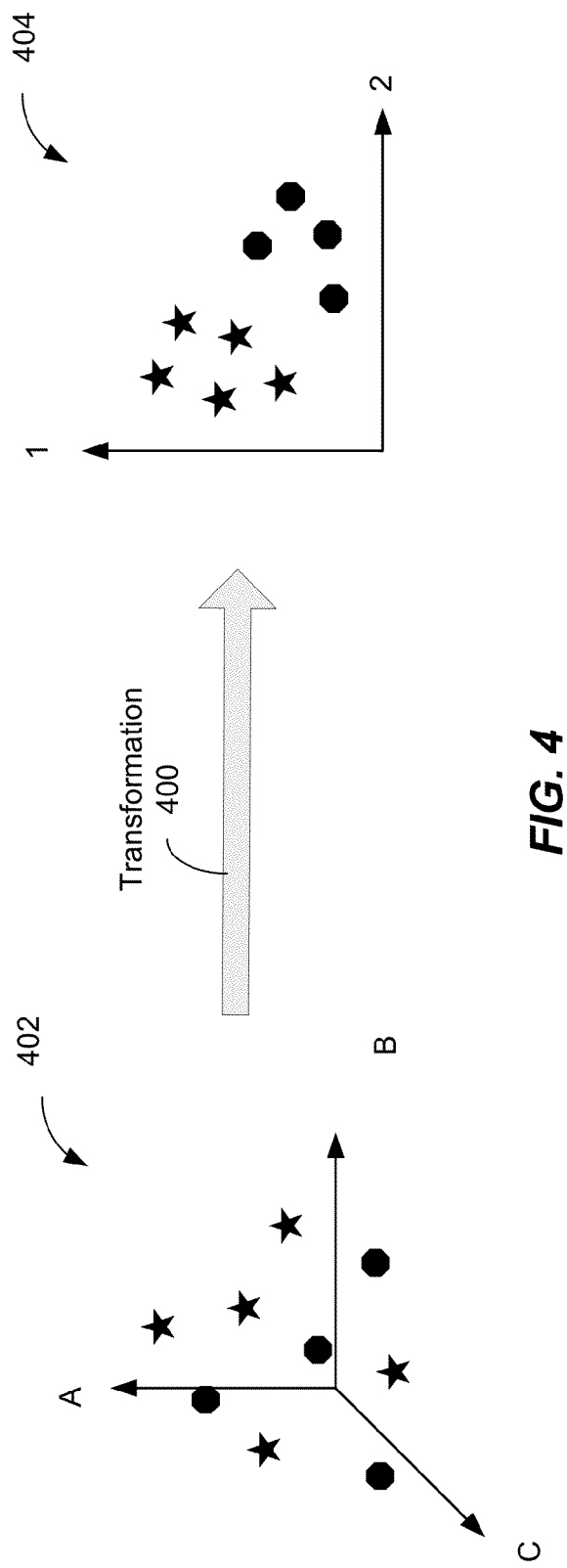
FIG. 4 is a schematic illustrating a transformation of data from a first space to a second space to increase separation in the data, in accordance with some embodiments.

FIG. 4 is a schematic illustrating principles underlying techniques described herein relating to transforming data into a different representational space. In FIG. 4, a number of observations (e.g., feature vectors formed from a given set of data) are shown before and after a transformation that changes the dimensionality of the representation of the data. In plot 402, the data is represented as feature vectors in a three dimensional space having axes/vector components A, B and C. The feature vectors denoted by circles represent data that should be grouped together (e.g., feature vectors belonging to a first classification), and the feature vectors denoted by stars represent data that should be grouped together (e.g., feature vectors belonging to a second classification). That these feature vectors should be grouped together as illustrated may not be known a priori (though it may be known via pre-labeling) but are shown as such to illustrate the principle. As shown, the distribution of the feature vectors in feature space may make meaningful clustering of the data difficult.

A transformation 400 may be applied to the feature vectors to transform the feature vectors into a two-dimensional space having axes/vector components 1 and 2. The axes 1 and 2 may, for example, relate to a first classification and a second classification, respectively. As shown, after transformation 400 is performed, there is better separation between data represented by circles and data represented by stars in the exemplary transformed space. Thus, it may be easier for a clustering algorithm to fit the data in the transformed space with a cluster for data represented as circles and cluster for data represented as stars because similar data tends to be closer together and dissimilar data farther apart.

The inventors have developed a number of transformations that project data represented in a first space (e.g., a feature space) into a representation in a second space (e.g., a label space) where the data exhibits more desirable separation (e.g., improved separation according to desired classifications or labels). According to some embodiments, one or more transformations in this respect are based on identifying a plurality of representative vectors, as discussed in further detail below in connection with FIG. 5. According to some embodiments, one or more transformations in this respect are based on frequency information, as discussed in further detail below in connection with FIG. 6.

Figure 5:
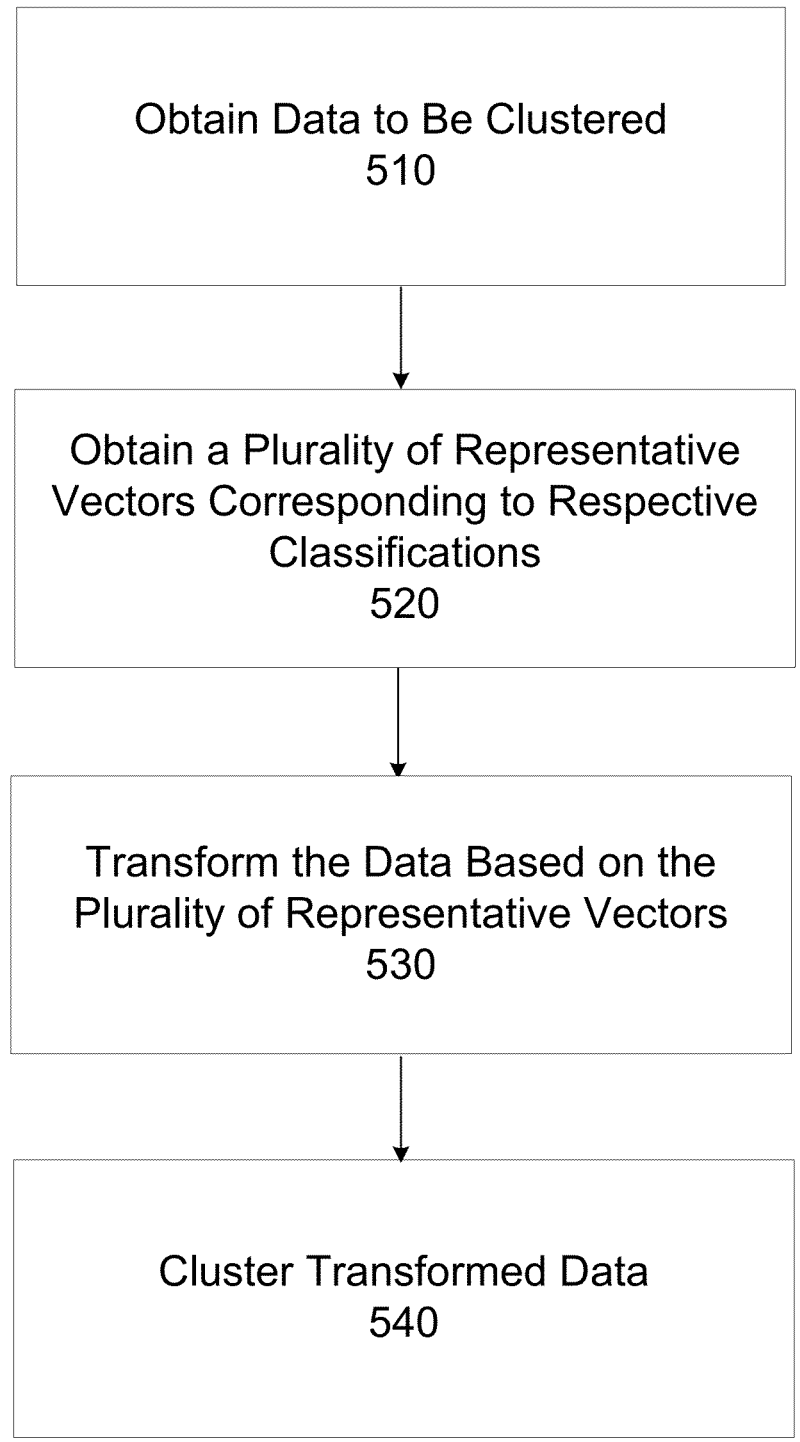
FIG. 5 illustrates a method of transforming data based on a plurality of representative vectors, in accordance with some embodiments.

FIG. 5 illustrates a method of transforming a set of data from a representation in a first space to a representation in a second space based on a plurality of representative data (e.g., representative vectors) selected or derived from the set of data, in accordance with some embodiments. In act 510, data to be clustered is obtained (e.g., training data for training a system to classify new data received during operation of the system may be obtained). If not already in a desired representational form, the data may be processed to produce a desired representation such as a plurality of feature vectors that represents the data in a corresponding feature space, techniques of which were described above.

The data to be clustered may represent any type of information for which clustering/classification may be desired (e.g., speech information for training a speech application, image data for training an image classification application, data representing observations regarding a population of interest, etc.). Any type of information for which clustering and/or classification may be desired may be used, as the aspects of the invention are not limited for use with any particular type of data and/or for use in any particular type of system.

In act 520, a plurality of representative vectors are obtained corresponding to classifications by which the data is to be clustered. For example, representative vectors may be identified, determined or derived from a plurality of feature vectors representing the data obtained in act 510, wherein each representative vector identified and/or determined from the feature vectors functions as a representative of a respective classification by which the data is to be clustered/labeled. Thus, according to some embodiments, at least one representative vector is obtained for each designated classification for use in transforming the feature vectors from a feature space into transformed vectors in a different representational space (e.g., using a transformation that changes the dimensionality of the representation).

According to some embodiments, a portion of the obtained data (which may include all of the data or some subset of the data) may be labeled according to the respective classifications. This process may be performed by a human annotator identifying or labeling some portion of the data according to the classification to which the human annotator deems the data belongs (this process is referred to as pre-labeling to denote that some portion of the data is labeled by classification prior to clustering). The representative vectors may then be selected, determined or derived from feature vectors corresponding to the pre-labeled data. Thus, for each desired classification, one or more representative vectors that are characteristic or representative of the corresponding classification according to a given criteria are obtained to facilitate transformation of the feature vectors, as discussed in further detail below.

The representative vectors may be selected based on any suitable criteria. For example, feature vectors that characterize or are representative of the corresponding classification according to some desired measure may be selected as representative vectors. For example, the representative vectors may be selected based on their proximity to feature vectors of the respective classification and/or their proximity to feature vectors of other classifications. In some embodiments, the representative vectors are support vectors determined based on the property that such vectors represent a boundary between feature vectors of the corresponding classification and feature vectors of other classifications, as discussed in further detail below. In other embodiments, the representative vectors may be chosen due to their exhibiting one or more characteristics of the feature vectors of corresponding classifications, such as a mean vector, eigenvector or other characteristic vector of data of corresponding classifications.

Representative vectors may be selected based on their position (e.g., centrality) relative to other feature vectors identified as belonging to the same classification, selected based on their proximity to feature vectors of other classifications (e.g., bordering feature vectors), based on one or more properties that characterize data of respective classifications, and/or selected according to some other property with respect to classification. A representative vector may be any feature vector that has been identified as belonging to a corresponding classification or derived therefrom to obtain at least one representative vector for each desired classification. While any feature vector of a given classification may operate as a representative vector to provide some measure of discriminating capabilities, the inventors have recognized that certain vectors (e.g., support vectors) may produce desirable separation when used as the basis for transforming feature vectors, some embodiments of which are discussed in further detail below.

In act 530, the data obtained in act 510 (e.g., represented as feature vectors) is transformed based on the representative vectors obtained in act 520 to project the data into a different representational space (e.g., to change the dimensionality of the representation of the data). According to some embodiments, a transformation matrix is formed based, at least in part, on the representative vectors and this transformation matrix is used to transform the data. For example, the data may be transformed using the representative vectors in accordance with the following transformation:

$$SX = Y \qquad (6)$$

Where S is a transformation based, at least in part, on selected representative vectors $s_i$ and applied to data X to obtained transformed data Y. According to some embodiments, data X are represented as feature vectors in a feature space $\Re^n$ and data Y are transformed vectors projected into a lower dimensional space $\Re^m$ corresponding to the classifications of interest. Accordingly, in some embodiments, the transformation based on representative vectors performs a projection as follows:

$$x \in \Re^n \rightarrow Sx \in \Re^m \qquad (7)$$

Where m is equal to (or related to) the number of classification or groups into which the data is to be clustered. For example, a representative vector may be obtained for each classification of interest (e.g., a representative vector may be identified or determined from a portion of data that has been pre-labeled according to respective designated classifications). Each representative vector may form, at least in part, a corresponding row in a transformation such that a transformation matrix is constructed as follows:

$$S = \begin{bmatrix} s_{11} & s_{12} & s_{1N} \\ s_{21} & s_{22} & s_{2N} \\ s_{m1} & s_{m2} & s_{mN} \end{bmatrix} \quad (8)$$

Where m may equal the number of designated classifications and N is greater than or equal to the dimensionality n of the feature vectors and corresponding feature space $\Re^n$. For example, each row may consist of an n-dimensional representative vector when N=n, or may include an n-dimensional representative vector and one or more additional terms (e.g., one or more bias terms) when N>n, as discussed in further detail below. As such, some embodiments include a transformation characterized as follows:

$$Sx = y \Rightarrow \begin{bmatrix} s_{11} & s_{12} & s_{1N} \\ s_{21} & s_{22} & s_{2N} \\ s_{m1} & s_{m2} & s_{mN} \end{bmatrix} \begin{bmatrix} x_1 \\ x_2 \\ x_n \\ b \end{bmatrix} = [y_1 \; y_2 \; y_m] \quad (9)$$

Where x is a feature vector of length n and y is a transformed vector of length m. When N>n (i.e., when the rows comprise representative vectors and one or more additional terms), feature vectors x, may include one or more values b to pad the feature vector for transformation so that it has a length N (e.g., the feature vectors may be padded with the identity value 1 to the same length as the rows of the transformation matrix S). When N=n, value(s) b may not be necessary and may be omitted.

The transformation operation formulated in equation 9 projects feature vectors in an n-dimensional feature space into transformed vectors in a lower m-dimensional space (e.g., into transformed vectors having a length m corresponding to the number of classifications used to pre-label at least a portion of the data X) based on representative vectors determined for each of the designated classifications.

The above transformation generally maps each feature vector into a transformed vector wherein each component of the transformed vector y provides a measure of similarity between the feature vector $x_j$ and the corresponding representative vector $s_i$. By virtue of the matrix multiplication operation, each component of transformed vectors $y_j$ represents the inner product between the feature vector $x_j$ and the corresponding representative vector $s_i$. In this respect, the transformation "locates" the associated data with respect to vectors that are representative of each designated classification, and tends to project data into alignment with corresponding classifications to facilitate more accurate clustering.

In act 540, the transformed data (e.g., represented by transformed vectors in a lower dimensional space) may be clustered. For example, a K-means algorithm may be used or a GMM approach may be implemented to cluster the transformed data. However, any algorithm capable of fitting clusters to the transformed data (e.g., identifying the locations of cluster centers) may be used to perform clustering, and optionally, labeling of the data according to the identified cluster to which the respective data is most closely located. The clusters, however defined, may then be used to classify new data, for example, by evaluating which cluster new data is "closest" to, as discussed in further detail below.

As discussed above, the inventors have appreciated that some representative vectors exhibit properties that, when used to transform data, tend to distinguish data according to the appropriate classifications. For example, the inventors have appreciated that support vectors are as a class of representative vectors that, when used to transform data, may achieve separation of the data according to designated classifications to facilitate clustering and/or classification.

Support vectors are representative vectors that are determined to lie near or on a boundary between features vectors of one classification or group and features vectors of other classifications or groups. As such, a support vector that is representative of a border or boundary between feature vectors of a corresponding classification and features vectors of other classifications (e.g., a feature vector that is located closest to a boundary between adjacent feature vectors of other classifications) may be determined for each of a designated number of classifications by which data has been pre-labeled. Such support vectors may be used to form a transformation, such as a transformation S as described above.

Support vectors may be determined from pre-labeled data using an algorithm such as a Support Vector Machine (SVM). SVM algorithms may, for example, project data into a higher dimensional space to locate a surface or hyperplane for each classification that borders vectors indicated as belonging to the respective classification and vectors indicated as belonging to other classifications, and identify a support vector for the respective classification that is located near or on the determined hyperplane (e.g., the closest vector of the respective classification to the boundary between vectors of other designated classifications). A support vector may be selected from the available feature vectors, or may be a vector that is generated to lie near or on a border or boundary between feature vectors of different classifications. In this respect, support vectors may be actual feature vectors or may be artificial vectors that are generated to have desired boundary characteristics.

Thus, for embodiments that utilize support vectors as the representative vectors, act 520 may include performing a suitable SVM algorithm to determine the appropriate support vectors. There exist numerous techniques for implementing an SVM that achieve identifying or generating such support vectors, and any such technique may be suitable for determining at least one support vector for each of a plurality of classifications according to which at least a portion of the data has been pre-labeled, and by which the data is to be clustered.

Using support vectors as representative vectors may produce transformed vectors in a space where data tends to cluster better according to the classifications to which they belong, thus facilitating improved subsequent clustering techniques. According to some embodiments in this respect, each row of a transformation matrix S may include a support vector associated with one of a plurality of classifications by which a portion of the data has been pre-labeled. In some embodiments, each row may have one or more additional terms representing a bias term(s) for the support vector. This bias term may represent an offset equal to the magnitude of the support vector, or may represent any other suitable bias term as needed. An exemplary transformation using support vectors may be represented as:

$$S = \begin{bmatrix} sv_{11} & sv_{12} & sv_{1n} - b_1 \\ sv_{21} & sv_{22} & sv_{2n} - b_2 \\ sv_{m1} & sv_{m2} & sv_{mn} - b_3 \end{bmatrix} \quad (10)$$

Where each row in S is formed from a support vector $sv_i$ associated with m classifications used to pre-label data. The above transformation is merely exemplary and support vectors may be used to transform data according to other formulations (e.g., formulations in which no bias terms are used and/or where matrix elements are derived from identified support vectors), as aspects of using support vectors to transform data are not limited to any particular formulation or implementation. The exemplary transformation matrix in equation 10 may be used to transform feature vectors as follows:

$$Sx = y \Rightarrow \begin{bmatrix} sv_{11} & sv_{12} & sv_{1n} - b_1 \\ sv_{21} & sv_{22} & sv_{2n} - b_2 \\ sv_{m1} & sv_{m2} & sv_{mn} - b_3 \end{bmatrix} \begin{bmatrix} x_1 \\ x_2 \\ x_n \\ 1 \end{bmatrix} = [y_1 \ y_2 \ y_m] \quad (11)$$

The above operation transforms a feature vector x into a transformed vector y based on support vectors $sv_i$ determined for each of m classifications by which at least some of the data represented by features vectors $x_i$ have been pre-labeled. Since the transformation matrix is formed based on support vectors, the transformation captures information about the boundaries between feature vectors of different classifications. As such, the matrix operation may provide an indication as to which side of these boundaries a given feature vector x is located. That is, each component of a transformed vector y may provide an indication as to where the feature vector x lies with respect to the corresponding boundary characterized by the respective support vector. Accordingly, such a transformation may tend to group data represented by the transformed vectors according to classification by locating the data with respect to the boundaries between data of the designated classification.

The inventors have further appreciated that techniques using a transformation that approximates at least one constraint using a cosine measure may be used in combination with transformation techniques that project data into a different representational space using representative vectors to produce further data separation, either by applying such a transformation before, after or simultaneously with a transformation based on identified representative vectors, as discussed in further detail below.

According to some embodiments in this respect, a transformation Λ that approximates one or more constraints operating on data using a cosine measure may be determined and used to redistribute the data to improve data separation. Representative vectors may then be identified and/or determined from the redistributed data to form a transformation S that transforms data in a first space to transformed data in a second space wherein the data is better separated according to pre-labeled classifications.

According to other embodiments, a transformation S formed from representative vectors for designated classifications is applied first to transform data in a first space to transformed data in a second space. A transformation Λ that approximates one or more constraints operating on the transformed data (e.g., operating on the data represented in the transformed space) using a cosine measure may be determined and used to redistribute the transformed data to improve separation of the data in the transformed space. Such techniques may be used in other combinations, as the aspects related to combining transformation techniques are not limited to any particular way of combining such techniques.

Figure 6:
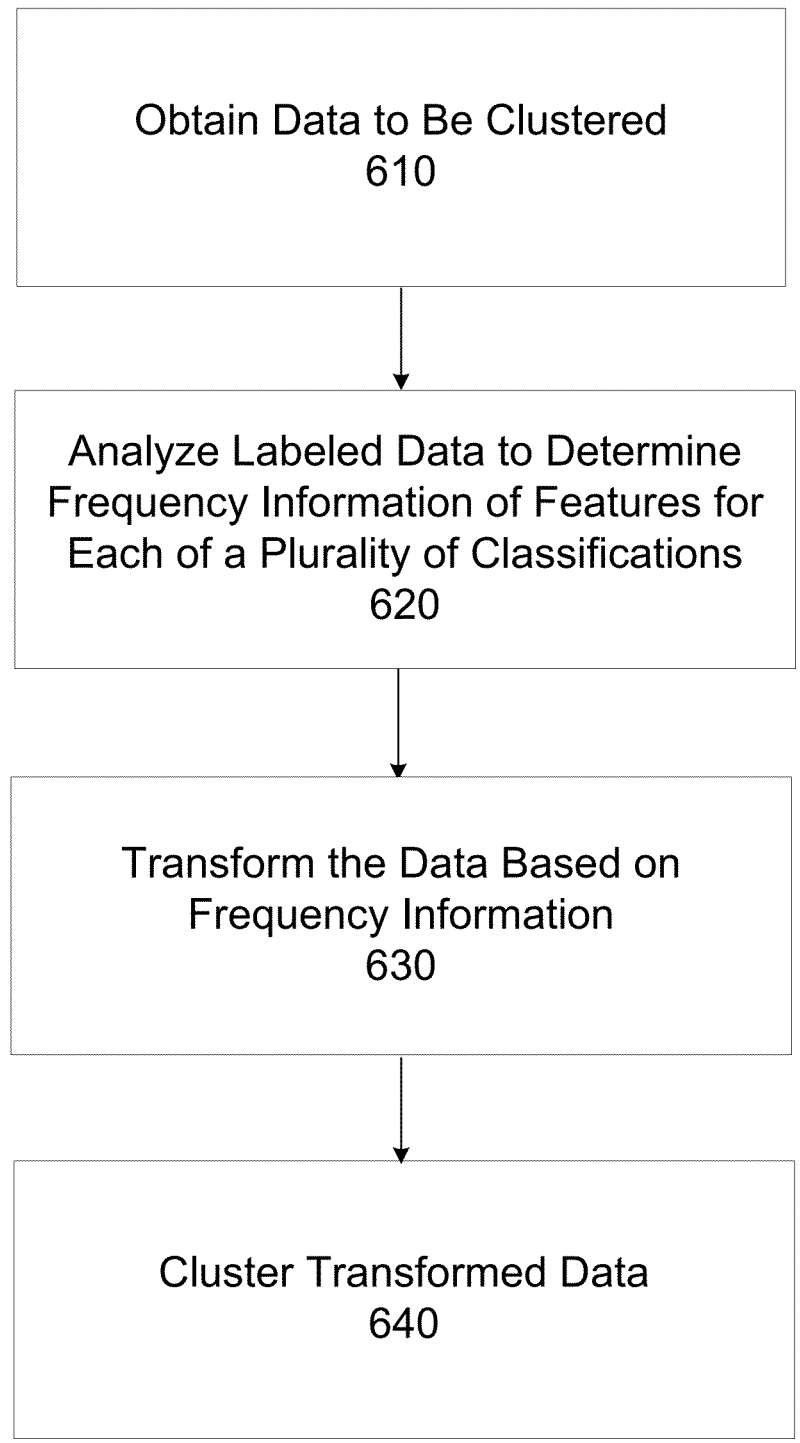
FIG. 6 illustrates a method of transforming data based on frequency information, in accordance with some embodiments.

As discussed above, the inventors have recognized that frequency information may be employed to facilitate data separation by taking into account how often features occur in data of respective classifications and/or in the data as a whole. FIG. 6 illustrates a method for transforming data according to frequency information related to features in the data, the frequency information being obtained by evaluating a portion of the data that has been labeled according to a plurality of classifications of interest. Some of the techniques described in this respect derive from the inventor's insight that features that occur frequently in data identified as belonging to a given classification may be highly indicative of membership in the group. As such, when given data includes such a feature, it may be beneficial to bias that data towards classifications that frequently exhibit that same feature. The inventors have appreciated that frequency information may be used to weight feature vectors to emphasize features occurring frequently in data of a given classification, some embodiments of which are discussed in further detail below.

In act 610, data to be clustered is obtained. For example, training data to enable a system to classify new data received during operation of the system may be obtained. As discussed above, the data may represent any type of information for which clustering/classification may be desired and the data is not limited to any particular type of data and/or for use in any particular type of system. A portion of the training data may have been pre-labeled according to the plurality of classifications, for example, by a human annotator indicating which classification each observation in the portion of the data belongs to. If the obtained data is not already pre-labeled, a portion (e.g., all or a subset of the data) may be pre-labeled according to the plurality of classifications.

In act 620, the pre-labeled data may be processed to obtain frequency information corresponding to one or more features of interest of the data. As discussed above, frequency information refers to information indicative of, relating to, or derived from how frequently features occur in the data. Frequency data may relate to how often features occur in the data as a whole, on a per classification basis, or both, as discussed in further detail below.

According to some embodiments, the pre-labeled data may be analyzed to determine how often a particular feature occurs in data of a given classification. In this respect, for each classification of interest, the data indicated as belonging to the respective classification may be analyzed and the number of times each feature of interest occurs in the data of that classification may be computed to obtain a feature count representing the class total for each feature of interest. When the data is represented as pre-labeled feature vectors, such feature counts may be obtained by summing respective vector components of the features vectors over each classification by which the data was labeled. Percentages, scaled counts, weights or any other type of frequency information may be computed from counting the features in the pre-labeled data, and the aspects in this respect are not limited to any particular representation or type of frequency information obtained from the pre-labeled data.

In act 630, the frequency information is used to transform the data to increase the separation between data of different classifications. According to some embodiments, a transformation may be computed based, at least in part, on frequency information indicative of feature counts or information derived from such feature counts. In particular, feature counts or measures derived from feature counts may be used to obtain weights indicating how significantly features identify with a particular classification (e.g., weights indicating the relative likelihood data belongs to a given classification when it exhibits the corresponding feature). Thus, when a given feature vector includes a particular feature that occurred frequently in feature vectors labeled as belonging to a given classification, a transformation based on such frequency information may map the feature vector into a space where the feature vector tends to strongly identify with the corresponding classification (e.g., the transformed vector has relatively high values along the axes corresponding to the appropriate classification).

The inventors have appreciated that frequency information may be used in numerous ways to transform feature vectors in a feature space into transformed vectors in a different space that tends to separate data according to classification, some embodiments of which are discussed in further detail below. According to some embodiments, a transformation matrix is computed having a vector (e.g., a row or column vector) for each classification by which the data is to be clustered. Each vector in the matrix may include a component that stores frequency information for each feature of interest in the data. For example, each element in the matrix may store the frequency (or a value derived therefrom) that the corresponding feature occurs in pre-labeled data according to classification. Such a transformation matrix may be expressed as follows:

$$T = \begin{bmatrix} t_{11} & t_{12} & t_{13} & t_{1n} \\ t_{21} & t_{22} & t_{23} & t_{2n} \\ t_{31} & t_{32} & t_{33} & t_{3n} \\ t_{m1} & t_{m2} & t_{m3} & t_{mn} \end{bmatrix} \quad (12)$$

Where n is the number of features of interest (e.g., the length of feature vectors representing the set of data to be clustered), m is the number of classifications by which the data was pre-labeled and is to be clustered, and $t_{ij}$ is frequency information about the $j^{th}$ feature for data labeled as belonging to the $i^{th}$ classification. As discussed above, this frequency information may be a count of the number of times the respective features occurs, a value derived from such a count such as a normalized count, weight, percentage, scaled count, or combination thereof, or any other value indicative of how often respective features occur in labeled data, some embodiments of which are discussed in further detail below.

The above transformation T may be used to transform feature vectors X representing a given set of data in a feature space $\Re^m$ to produce transformed vectors Y in a label space $\Re^n$, for example, according to the following transformation:

$$Tx = y \Rightarrow \begin{bmatrix} t_{11} & t_{12} & t_{13} & t_{1n} \\ t_{21} & t_{22} & t_{23} & t_{2n} \\ t_{31} & t_{32} & t_{33} & t_{3n} \\ t_{m1} & t_{m2} & t_{m3} & t_{mn} \end{bmatrix} \begin{bmatrix} x_1 \\ x_2 \\ x_3 \\ x_n \end{bmatrix} = [y_1 \ y_2 \ y_3 \ y_m] \quad (13)$$

Each transformed vector $y_i$ has a component corresponding to each classification indicating how well features present in a given feature vector correlate with frequently occurring features in the corresponding classifications (e.g., as determined by obtaining frequency information from pre-labeled data). As such, if a given feature vector x includes features that frequently occur in data of a given classification, the transformed vector y may have a relatively high value for the vector component corresponding to the given classification. As such, the transformed vectors y represent how well the corresponding data correlates with each classification from a feature occurrence perspective.

Using a transformation T, transformed vectors y will tend to cluster according to classification by having relatively high values for axes of the respective classification(s) to which the respective data exhibits strong feature correlation. It should be appreciated that the above transformation is merely one example of how frequency information may be used to transform data, and frequency information may be used in others ways and used to formulate different transformations, as the aspects of the invention are not limited in this respect.

As discussed above, the matrix elements $t_{ij}$ may include any type of frequency information including, but not limited to, feature counts or values derived therefrom. In this respect, the inventors have appreciated that if a feature occurs frequently in data belonging to a given classification and occurs infrequently in data of other classifications, such a feature should have increased emphasis with respect to biasing feature vectors towards the appropriate classification (e.g., relative to features that occur frequently in multiple or all of the classes).

According to some embodiments, features that occur frequently in data of a given classification but infrequently, less frequently or not at all in other classifications are emphasized to influence the separation of the transformed data according to classification. For example, the frequency of features occurring in data for a given classification may be scaled according to how many other classifications have associated data that include given features. In this respect, one example formulation is as follows:

$$t_{ij} = \left(\frac{N_{ij}}{N_j}\right) \cdot \log\left(\frac{m}{m_i}\right) \quad (14)$$

Where $t_{ij}$ may be the elements in a transformation matrix such as transformation T illustrated above. In equation 14, the first term in the product (i.e., $N_{ij}/N_j$) expresses the ratio of a count of the i-th feature in utterances labeled by the j-th label ($N_{ij}$) and the sum of all feature counts of label j ($N_j$). As such, this first term in the product represents a normalized feature count for a given feature i in a given classification j. The second term in the product (i.e., log(m/$m_i$)), expresses the log of the total number of classifications/labels m divided by the number of classifications having data containing feature i.

The second term is formulated such that it is generally small when a feature appears in data of multiple classifications and is generally large when a feature appears in data of one or a few classifications, thereby providing a weight that depends on how suggestive a given feature is of a given classification (i.e., the relative uniqueness of a feature to a classification). Thus, the second term operates to scale the normalized count according to the number of classifications that exhibit a given feature to emphasize when a feature is specific to data of one or a small number of classifications and de-emphasize features that are more general to a large numbers of classifications.

It should be appreciated that weighting feature counts may be formulated in numerous ways, and the above formulation is only one technique for implementing a scale that takes into account how unique or how common a feature is with respect to the designated classifications. The frequency at which a feature occurs in a given classification relative to the frequency the feature occurs over all classifications may also be taken into account. For example, the percentage of the occurrences of a given feature in a labeled set of data contributed by a given classification (or one or more values derived therefrom) may be used to scale frequency count information (e.g., a normalized feature count) such that the frequency count information is weighted by how strongly a particular feature is indicative of a given classification. It should be further appreciated that such a scaling or weight, however formulated, is optional and is not requirement of a transformation based on frequency information, as frequency information may be used in any way to transform data.

In act 640, data transformed based, at least in part, on frequency information may be clustered. For example, a K-means algorithm may be used or a GMM approach may be implemented to cluster the data in its transformed representation. However, any algorithm capable of fitting clusters to the data (e.g., identify centers of data clusters) may be used to perform clustering, and optionally, associating the data according to the established cluster to which the respective data is most closely located. The clusters, however defined, may then be used to classify new data, for example, by evaluating which cluster the new data is "closest" to, as discussed in further detail below.

Similar to the discussion in connection with using representative vectors, the inventors have appreciated that techniques using a transformation that approximates at least one constraint using a cosine measure may be used in combination with transformation techniques using frequency information to facilitate subsequent clustering and/or classification, either by applying such a transformation before, after or simultaneously with a transformation based on frequency information.

According to some embodiments in this respect, a transformation $\Lambda$ that approximates one or more constraints using a cosine measure may be determined and used to redistribute the data to improve separation. Frequency information (e.g., obtained according to techniques described above, or obtained otherwise) may then be used to form a transformation T that transforms data in a first space to transformed data in a second space to obtain improved separation according to classification.

According to other embodiments, a transformation T based on frequency information may be applied first to transform data in a first space to transformed data in a second space. A transformation $\Lambda$ that approximates one or more constraints operating on the transformed data (e.g., the data represented in the transformed space) using a cosine measure may be determined and used to redistribute the transformed data to provide a distribution better suited for clustering.

Transformation techniques for transforming data from a first space to a second space may also be combined. For example, one or more transformations based on representative vectors may be combined with one or more transformations based on frequency information. Such combinations may be used alone or in combination with transformations that apply one or more constraints using a cosine measure. Combining transformations may be achieved by serially applying the desired transformations in a suitable order, or may be achieved by combining the transformations into one or more combined transformations to achieve the desired transformation of the data. The transformation techniques described herein may be used in any combination, as the aspects related to combining transformation techniques are not limited to any particular combination or way of combining the desired transformations.

Figure 7:
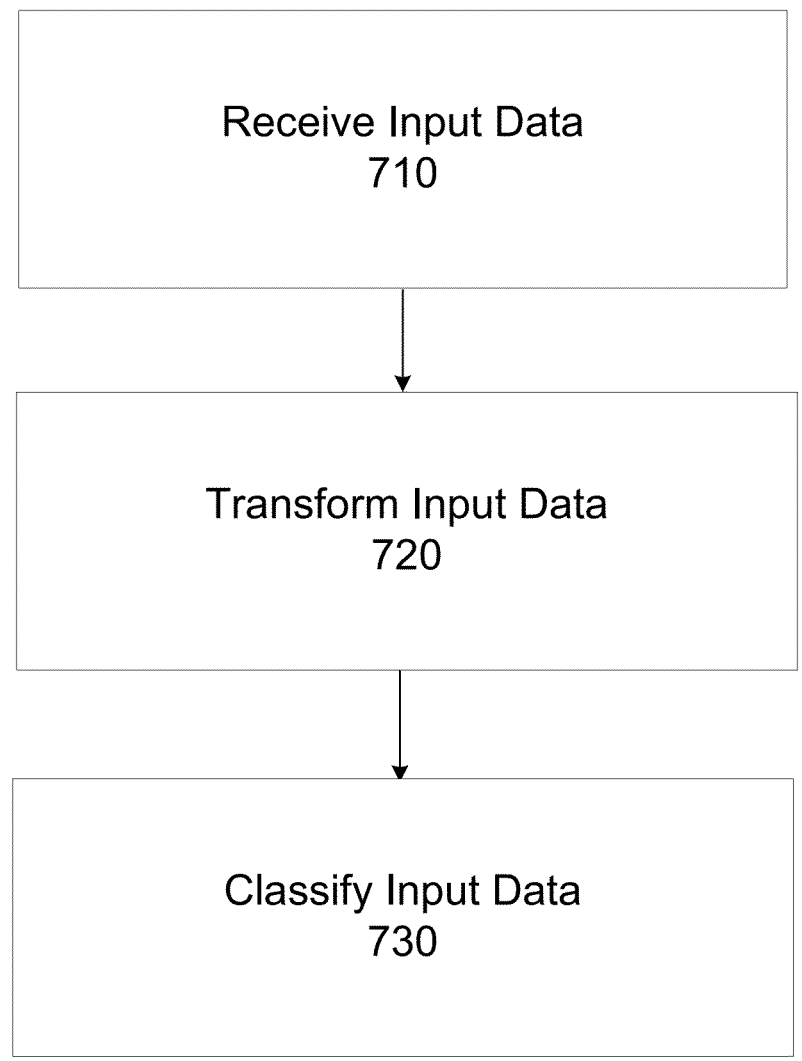
FIG. 7 illustrates a method of transforming input data to classify the input data, in accordance with some embodiments.

As discussed above, established and labeled clusters may be used to classify new input data by comparing the input data to the established clusters and classifying the data according to the cluster the input data is nearest. For example, a system trained according to any one or combination of techniques described above may classify input data received by the system during operation or deployment. FIG. 7 illustrates an exemplary method of classifying input data according classifications by which data was previously clustered and labeled, according to some embodiments.

In act 710, input data to be classified is received. The input data may be received from a user of a deployed system configured to classify the input data to determine what action should be taken in response to the user input. For example, the input data may correspond to user speech received by a speech application configured to classify the speech in order to understand the intent of the user and perform one or more associated actions or operations. When the input data corresponds to user speech, the speech may be processed by one or more automatic speech recognition (ASR) components to convert the speech to text. However, the input data may be other types of data such as text, numeric information, image data or other information for which classification is desired and for which the system has been trained, or otherwise adapted to classify.

In act 720, the received input data is transformed using the one or more transformations applied to data during clustering and labeling of the data during a training phase. For example, one or any combination of transformations described herein used to transform data to facilitate clustering and/or labeling may be used to transform the input data. By transforming the input data using the same transformation or combination of transformations, the input data can be compared to the previously established and labeled clusters to determine which cluster the input data is most similar to (e.g., which cluster the input data is located closest to or most likely belong to after being transformed in the manner in which the training data was transformed).

In particular, the input data may be transformed using transformations that approximate one or more constraints using a cosine measure, one or more transformations that utilize representative vectors and/or one or more transformations that utilize frequency information, various techniques of which have been described in the foregoing, depending on which transformation or combination of transformations were used to establish the clusters. Having undergone the same transformation or combination of transformations, the transformed input data may be compared to the previously established clusters to classify the input data.

In act 730, the input data is classified based on its similarity to previously established and labeled clusters. For example, the transformed input data may be compared to each cluster to determine which cluster the transformed input data is positioned closest to according to some distance measure. According to some embodiments, a distance between the transformed input data and each respective cluster center or mean may be computed (e.g., when a K-means or similar clustering algorithm was used to cluster the training data), or the likelihood that the input data belongs to each cluster may be determined (e.g., when a GMM approach was used to cluster the data). It should be appreciated that determining which cluster the input data belongs to may differ depending on the clustering technique employed to cluster the data and aspects of determining the "closest" cluster are not limited to any particular technique or techniques.

According to some embodiments, evaluating which cluster input data belongs to includes using a cosine measure as a similarity metric. However, other distance metrics (e.g., one or more Euclidean or Cartesian distance measures) may be used, either alone or in combination (e.g., via a voting scheme that considers multiple measures) with a cosine measure to determine which cluster the input data is nearest or most likely belongs to, as the measurement of proximity is not limited in any respect. The input data may then be classified according to the cluster to which it was determined the input data belongs (e.g., according to the label of the nearest cluster). This classification may be used, for example, by a system to take one or more actions and/or perform one or more operations in response to the classification assigned to the input data.

Figure 8:
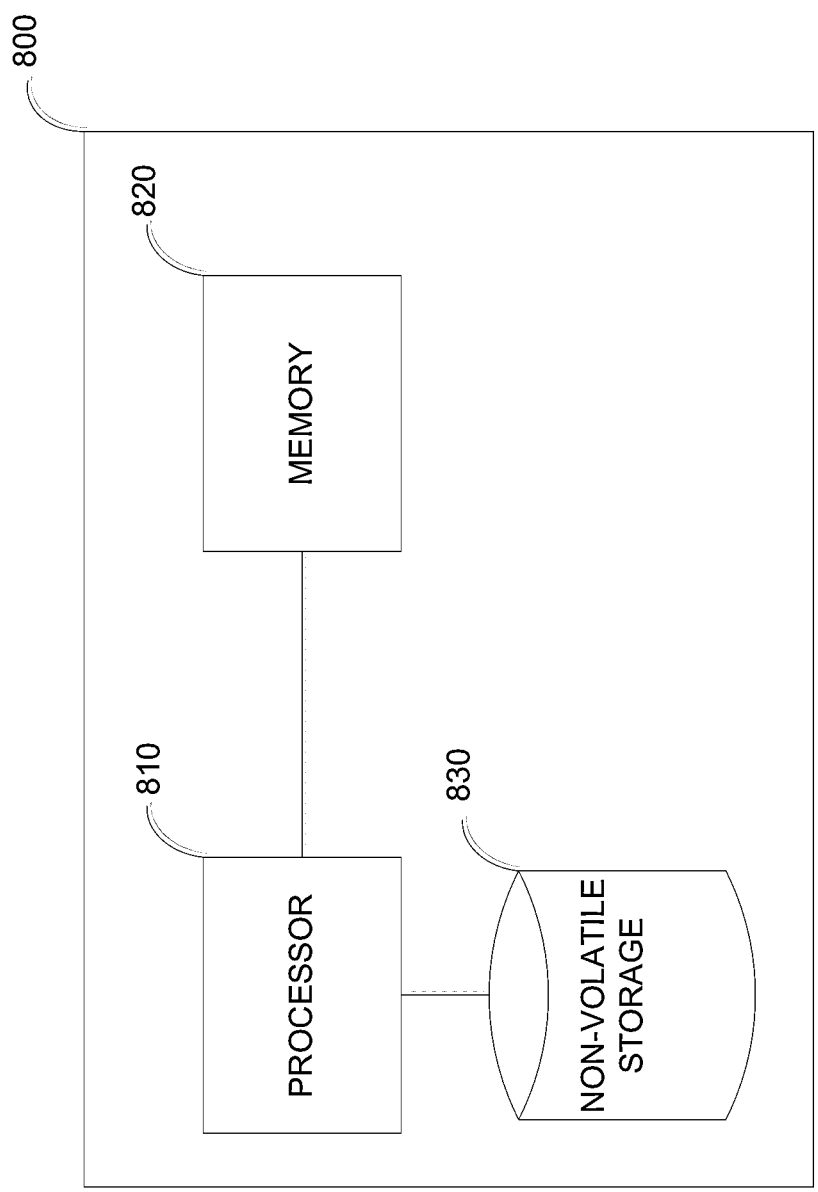
FIG. 8 illustrates an exemplary computer system suitable for implementing transformation techniques according to some embodiments.

An illustrative implementation of a computer system 800 that may be used to implement one or more of the transformation techniques described herein, either to facilitate clustering (e.g., in a training phase) or to classify input data (e.g., in a classification stage), is shown in FIG. 8. Computer system 800 may include one or more processors 810 and one or more non-transitory computer-readable storage media (e.g., memory 820 and one or more non-volatile storage media 830). The processor 810 may control writing data to and reading data from the memory 820 and the non-volatile storage device 830 in any suitable manner, as the aspects of the invention described herein are not limited in this respect.

To perform functionality and/or techniques described herein, the processor 810 may execute one or more instructions stored in one or more computer-readable storage media (e.g., the memory 820, storage media, etc.), which may serve as non-transitory computer-readable storage media storing instructions for execution by the processor 810. Computer system 800 may also include any other processor, controller or control unit needed to route data, perform computations, perform I/O functionality, etc. For example, computer system 800 may include any number and type of input functionality to receive data and/or may include any number and type of output functionality to provide data, and may include control apparatus to operate any present I/O functionality.

In connection with the transformation techniques described herein, one or more programs that evaluate data, determine one or more transformations, transform data according to determined transformations, cluster data and/or classify data may be stored on one or more computer-readable storage media of computer system 800. Processor 810 may execute any one or combination of such programs that are available to the processor by being stored locally on computer system 800 or accessible over a network. Any other software, programs or instructions described herein may also be stored and executed by computer system 800. Computer 800 may be a standalone computer, mobile device, etc., and may be connected to a network and capable of accessing resources over the network and/or communicate with one or more other computers connected to the network.

Figure 9:
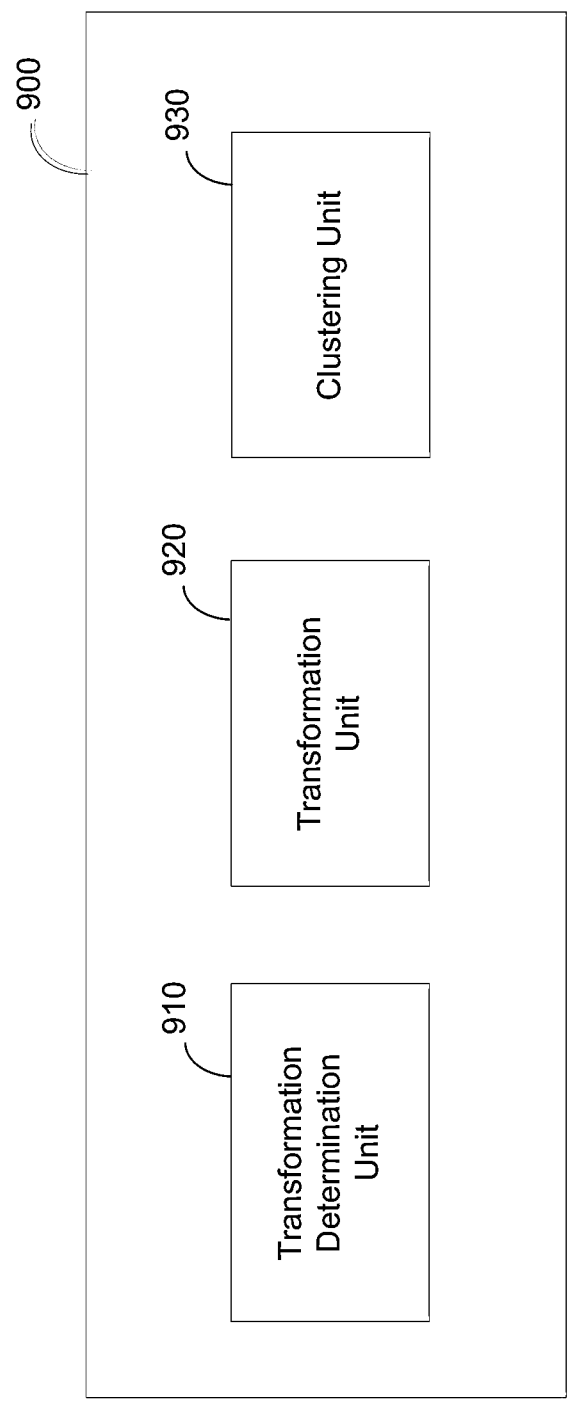
FIG. 9 is a block diagram illustrating functional units implementing transformation techniques to facilitate clustering, in accordance with some embodiments.

FIG. 9 illustrates a schematic of a system for processing and clustering data to train the system to be able to classify data by comparing input data to established and labeled clusters. System 900 is illustrated as comprising a number of functional units that perform specified operations to achieve data transformation and clustering in accordance with any one or combination of techniques described herein. The functional units may be implemented using, for example, a computer system (or multiple computer systems) such as computer system 800 described above in connection with FIG. 8.

System 900 comprises a transformation determination unit 910 configured to generate one or more transformations by which a set of data (e.g., training data) may be transformed. In particular, transformation determination unit 910 may be configured to generate any one or combination of transformations described herein. For example, transformation determination unit 910 may optimize an objective function that approximates one or more constraints evaluated according to at least one cosine measure to obtain a transformation, e.g., a transformation $\Lambda$ as discussed in the foregoing, and more particularly, in connection with the method illustrated in FIG. 4 and described in the accompanying description.

Alternatively, or in addition to, transformation determination unit 910 may evaluate the training data and determine a plurality of representative vectors to use as the basis of a transformation, for example, a transformation S as discussed in the foregoing, and more particularly, in connection with the method illustrated in FIG. 5 and described in the accompanying description. Transformation determination unit 910 may alternatively, or in addition to, evaluate the training data to obtain frequency information to use as the basis of a transformation, for example, a transformation T as discussed in the foregoing, and more particularly, in connection with the method illustrated in FIG. 6 and described in the accompanying description. Accordingly, transformation determination unit 910 may be configured to generate one or any combination of transformations described herein.

System 900 also includes transformation unit 920 configured to transform data according to one or more transformations generated by transformation determination unit 910 to produce transformed data. In particular, one or a desired combination of transformations described herein may be applied to data to produce transformed data to facilitate clustering and/or labeling of the data. As discussed above, the transformations described herein may be used alone or in any combination to produce transformed data that is better separated in relation to intended classifications than prior to transformation.

System 900 also includes a clustering unit 930 configured to fit a desired number of clusters to the transformed data, for example, a number of clusters corresponding to the number of classifications by which it is desired to classify input data, for example, input data received from users of a system. As discussed above, any suitable clustering algorithm may be used to cluster the data such as K-means or GMM techniques, and clustering unit 930 may be configured to implement one or any combination of suitable clustering techniques to evaluate the transformed data and establish a desired number of clusters based on the distribution of the transformed data (e.g., by identifying cluster centers or means, cluster standard deviations, cluster boundaries, etc. that best fits the transformed data). The training data may then be labeled to associate each observation with the nearest established cluster.

Figure 10:
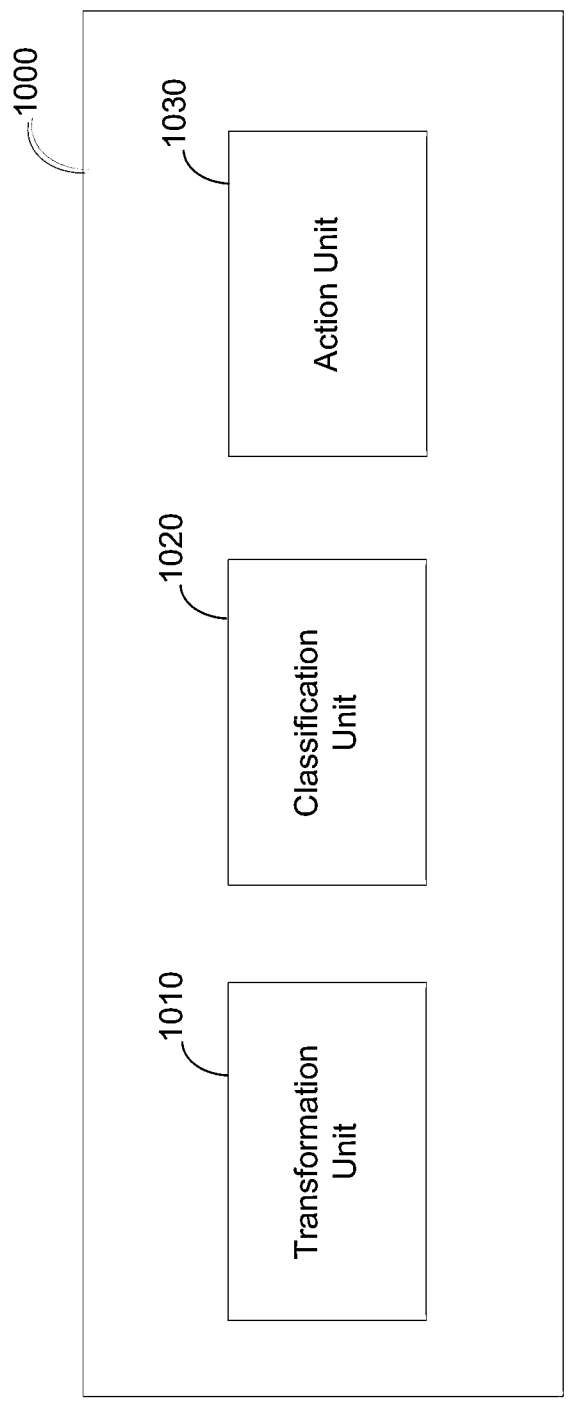
FIG. 10 is a block diagram illustrating function units for implementing transformation techniques to facilitate classifying input data, in accordance with some embodiments.

FIG. 10 illustrates a schematic of a system for classifying input data. As with system 900, system 1000 is illustrated as comprising a number of functional units that perform specified operations and that may be implemented using, for example, a computer system (or multiple computer systems) such as computer system 800. System 1000 includes a transformation unit 1010 that receives input data and transforms the input data according to one or any combination of transformations described herein. In particular, transformation unit 1010 may be configured to transform the input data using the same one or combination of transformations used to cluster and/or label training data. Accordingly, system 1000 may be configured to produce transformed input data for classification.

Transformation unit 1010 may include or have access to one or more ASR components capable of converting speech input to text. As such, when system 1000 is a speech application, speech input may be converted to a format for further processing to classify the speech. However, in applications wherein the input data is not speech, an ASR component or access to an ASR component may not be needed.

System 1000 further includes classification unit 1020 configured to classify the input data, for example, by comparing the transformed input data with established clusters obtained by clustering a set of training data and labeling established cluster according to desired classifications. In particular, classification unit 1020 may be configured to determine which cluster the transformed input data belongs to (e.g., by finding the nearest cluster center/mean or determining the most likely cluster) and to classify the input data according to the label given to identified cluster. According to some embodiments, at least one cosine measure is used to determine which cluster the transformed input data belongs to. Alternatively, conventional measures such as a Euclidean distance may be used to determine which cluster the input data should be associated with. Combinations of cosine measures and conventional measures may be combined (e.g., in a voting scheme or a weighting scheme) when evaluating which cluster the input data belongs to.

System 1000 may also include an action unit 1030 configured to initiate one or more actions in response to the classification of the input data. For example, the input data may be speech data (e.g., text recognized from a user's speech input) and action unit 1030 may initiate one or more actions based on the classification of the speech input. In particular, the classification may indicate the meaning of the speech input and the action unit 1030 may perform one or more actions reflective of the user's intent in providing the speech input (e.g., a voice command, voice query, etc.).

It should be appreciated that functional units in systems 900 and 1000 may be implemented on a single computer system or distributed over multiple computer systems such that the corresponding methods may be performed by one computer or the methods may be distributed over multiple computers in any manner, as the aspects are not limited to any particular implementation. It should be further appreciated that while the functional units are illustrated as separate units, the different units may be implemented by programs that are integrated in any way such that a given program may perform the functionality of one or any combination of the described functional units. The functional units are illustrated as separate blocks for clarity of description but may be implemented using any combination of integrated, distributed and/or modular programs, as these functional aspects are not limited to any particular implementation.

Having thus described several aspects of embodiments of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above.

As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of classifying input data as belonging to one of a plurality of classifications, the plurality of classifications associated with a respective plurality of clusters that were fit to training data, the method comprising:
    obtaining a first transformation used to transform the training data when the plurality of clusters were fit to the training data, the first transformation approximating at least one constraint relating to a similarity and/or dissimilarity of at least a portion of the training data, wherein the first transformation was determined using a cosine similarity as a measure of the similarity and/or dissimilarity of the at least a portion of the training data;
    transforming the input data using at least the first transformation to obtain transformed input data;
    comparing the transformed input data to the plurality of clusters to determine which cluster of the plurality of clusters the input data should be associated with; and
    classifying the input data according to a classification of the plurality of classifications associated with the cluster that the input data was determined to be associated with,
    wherein the at least one constraint was specified by identifying a first set of data pairs in the data, the first set of data pairs indicating that the data identified by each respective data pair in the first set of data pairs was associated with a same classification, and was specified by identifying a second set of data pairs in the data, the second set of data pairs indicating that data identified in each respective data pair in the second set of data pairs was associated with a different classification.

2. The method of claim 1, wherein comparing the transformed input data to the plurality of cluster comprises determining which cluster center the transformed input data is closest to using at least one of a cosine similarity and a Euclidean distance.

3. The method of claim 1, wherein the first transformation was determined by selecting values for the first transformation that increased the similarity, upon transformation by the first transformation, of at least some of the data pairs in the first set of data pairs according to the cosine similarity, and decreased the similarity, upon transformation by the first transformation, of at least some of the data pairs in the second set of data pairs according to the cosine similarity.

4. The method of claim 1, wherein the first transformation was determined by optimizing a function that included the first transformation as a parameter.

5. The method of claim 4, wherein the function included at least one first term that evaluates the cosine similarity between data in each respective data pair in the first set of data pairs transformed using the first transformation.

6. The method of claim 5, wherein the function included at least one second term that evaluates the cosine similarity between data in each respective data pair in the second set of data pairs transformed using the first transformation.

7. The method of claim 6, wherein the first transformation was selected as a transformation that tended to maximize the at least one first term and minimize the at least one second term.

8. The method of claim 1, wherein the first transformation includes a diagonal matrix.

9. The method of claim 1, further comprising performing at least one action based on the classification of the input data.

10. The method of claim 1, wherein the input data represents a speech input from a user.

11. The method of claim 1, further comprising:
    obtaining at least one second transformation, the at least one second transformation comprising at one least one of:
    a transformation determined based, at least in part, on at least one representative vector that was determined from the training data for each of a plurality of classifications; and
    a transformation determined based, at least in part, on frequency information that was determined based on features represented in the training data; and
    applying the at least one second transformation to the input data to obtain the transformed input data.

12. At least one non-transitory computer readable storage medium storing instructions, that when executed by at least one processor, perform a method of classifying input data as belonging to one of a plurality of classifications, the plurality of classifications associated with a respective plurality of clusters that were fit to training data, the method comprising:
    obtaining a first transformation used to transform the training data when the plurality of clusters were fit to the training data, the first transformation approximating at least one constraint relating to a similarity and/or dissimilarity of at least a portion of the training data, wherein the first transformation was determined using a cosine similarity as a measure of the similarity and/or dissimilarity of the at least a portion of the training data;

transforming the input data using at least the first transformation to obtain transformed input data;

comparing the transformed input data to the plurality of clusters to determine which cluster of the plurality of clusters the input data should be associated with; and classifying the input data according to a classification of the plurality of classifications associated with the cluster that the input data was determined to be associated with, wherein the at least one constraint was specified by identifying a first set of data pairs in the data, the first set of data pairs indicating that the data identified by each respective data pair in the first set of data pairs was associated with a same classification, and was specified by identifying a second set of data pairs in the data, the second set of data pairs indicating that data identified in each respective data pair in the second set of data pairs was associated with a different classification.

13. The at least one non-transitory computer readable storage medium of claim 12, wherein comparing the transformed input data to the plurality of cluster comprises determining which cluster center the transformed input data is closest to using at least one of a cosine similarity and a Euclidean distance.

14. The at least one non-transitory computer readable storage medium of claim 12, wherein the first transformation was determined by selecting values for the first transformation that increased the similarity, upon transformation by the first transformation, of at least some of the data pairs in the first set of data pairs according to the cosine similarity, and decreased the similarity, upon transformation by the first transformation, of at least some of the data pairs in the second set of data pairs according to the cosine similarity.

15. The at least one non-transitory computer readable storage medium of claim 12, wherein the first transformation was determined by optimizing a function that included the first transformation as a parameter.

16. The at least one non-transitory computer readable storage medium of claim 15, wherein the function included at least one first term that evaluates the cosine similarity between data in each respective data pair in the first set of data pairs transformed using the first transformation.

17. The at least one non-transitory computer readable storage medium of claim 16, wherein the function included at least one second term that evaluates the cosine similarity between data in each respective data pair in the second set of data pairs transformed using the first transformation.

18. The at least one non-transitory computer readable storage medium of claim 17, wherein the first transformation was selected as a transformation that tended to maximize the at least one first term and minimize the at least one second term.

19. The at least one non-transitory computer readable storage medium of claim 12, wherein the first transformation includes a diagonal matrix.

20. The at least one non-transitory computer readable storage medium of claim 12, further comprising performing at least one action based on the classification of the input data.

21. The at least one non-transitory computer readable storage medium of claim 12, wherein the input data represents a speech input from a user.

22. The at least one non-transitory computer readable storage medium of claim 12, the method further comprising:

obtaining at least one second transformation, the at least one second transformation comprising at one least one of:

a transformation determined based, at least in part, on at least one representative vector that was determined from the training data for each of a plurality of classifications; and a transformation determined based, at least in part, on frequency information that was determined based on features represented in the training data; and applying the at least one second transformation to the input data to obtain the transformed input data.

23. A system for classifying input data as belonging to one of a plurality of classifications, the plurality of classifications associated with a respective plurality of clusters that were fit to training data, the system comprising:

at least one computer readable storage medium for storing the input data and for storing a first transformation used to transform the training data when the plurality of clusters were fit to the training data, the first transformation approximating at least one constraint relating to a similarity and/or dissimilarity of at least a portion of the training data, wherein the first transformation was determined using a cosine similarity as a measure of the similarity and/or dissimilarity of the at least a portion of the training data; and at least one processor capable of accessing the at least one computer readable storage medium, the at least one processor configured to:

transform the input data using at least the first transformation to obtain transformed input data:

compare the transformed input data to the plurality of clusters to determine which cluster of the plurality of clusters the input data should be associated with; and classify the input data according to a classification of the plurality of classifications associated with the cluster that the input data was determined to be associated with, wherein the at least one constraint was specified by identifying a first set of data pairs in the data, the first set of data pairs indicating that the data identified by each respective data pair in the first set of data pairs was associated with a same classification, and was specified by identifying a second set of data pairs in the data, the second set of data pairs indicating that data identified in each respective data pair in the second set of data pairs was associated with a different classification.

24. The system of claim 23, wherein the at least one processor is configured to determine which cluster center the transformed input data is closest to using at least one of a cosine similarity and a Euclidean distance.

25. The system of claim 23, wherein the first transformation was determined by selecting values for the first transformation that increased the similarity, upon transformation by the first transformation, of at least some of the data pairs in the first set of data pairs according to the cosine similarity, and decreased the similarity, upon transformation by the first transformation, of at least some of the data pairs in the second set of data pairs according to the cosine similarity.

26. The system of claim 23, wherein the first transformation was determined by optimizing a function that included the first transformation as a parameter.

27. The system of claim 26, wherein the function included at least one first term that evaluates the cosine similarity between data in each respective data pair in the first set of data pairs transformed using the first transformation.

28. The system of claim 27, wherein the function included at least one second term that evaluates the cosine similarity between data in each respective data pair in the second set of data pairs transformed using the first transformation.

29. The system of claim 28, wherein the first transformation was selected as a transformation that tended to maximize the at least one first term and minimize the at least one second term.

30. The system of claim 23, wherein the first transformation includes a diagonal matrix.

31. The system of claim 23, wherein the at least one processor is configured to perform at least one action based on the classification of the input data.

32. The system of claim 23, wherein the input data represents a speech input from a user.

33. The system of claim 23, the at least one processor configured to:
 obtain at least one second transformation, the at least one second transformation comprising at one least one of:
 a transformation determined based, at least in part, on at least one representative vector that was determined from the training data for each of a plurality of classifications; and
 a transformation determined based, at least in part, on frequency information that was determined based on features represented in the training data; and
 apply the at least one second transformation to the input data to obtain the transformed input data.

* * * * *